(12) United States Patent
Prophete et al.

(10) Patent No.: US 9,905,034 B2
(45) Date of Patent: Feb. 27, 2018

(54) SECURE ISOLATION OF SCRIPTING FROM NATIVE GRAPHIC RENDERING OF ANIMATED DATA VISUALIZATIONS

(71) Applicant: salesforce.com, inc., San Francisco, CA (US)

(72) Inventors: Didier Prophete, San Francisco, CA (US); Yenan Chen, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 329 days.

(21) Appl. No.: 14/857,662

(22) Filed: Sep. 17, 2015

(65) Prior Publication Data

US 2017/0076091 A1 Mar. 16, 2017

Related U.S. Application Data

(63) Continuation-in-part of application No. 14/853,727, filed on Sep. 14, 2015, now abandoned.

(51) Int. Cl.
| *G06T 13/00* | (2011.01) |
| *G06T 13/80* | (2011.01) |
| *G06T 11/20* | (2006.01) |
| *G06F 21/53* | (2013.01) |
| *G06F 17/30* | (2006.01) |

(52) U.S. Cl.
CPC ........ *G06T 13/00* (2013.01); *G06F 17/30572* (2013.01); *G06F 21/53* (2013.01); *G06T 11/206* (2013.01); *G06T 13/80* (2013.01); *G06F 2221/033* (2013.01)

(58) Field of Classification Search
CPC .............. G06T 13/00–13/80; G06T 11/206
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Salesforce, "Force.com Canvas Developer's Guide—Version 34.0, Summer '15," @salesforcedocs, 2015, pp. 114.

(Continued)

*Primary Examiner* — Daniel Hajnik
(74) *Attorney, Agent, or Firm* — Haynes Beffel & Wolfeld LLP

(57) ABSTRACT

The disclosed technology includes systems and methods for secure isolation of scripting from graphical representations in a unified charting framework. The technology disclosed relates to a platform for ultra-fast, ad-hoc data exploration and faceted navigation on integrated, heterogeneous data sets. The disclosed apparatus and methods for secure isolation of scripting from graphics make it possible to securely share live data as rendered on a live dashboard, for both desktop and mobile application environments, without saving a new state on a server when time data and dashboard elements are updated. The disclosed unified charting framework makes it possible to target multiple platforms—generating data visualization representations that can be displayed when rendered natively on both desktop and mobile devices, and when rendered in a browser window.

25 Claims, 19 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achadoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 8,775,941 B1 * | 7/2014 | Deshpande ............ H04L 67/22 715/736 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

(56) References Cited

U.S. PATENT DOCUMENTS

| | | | | |
|---|---|---|---|---|
| 2014/0247268 A1* | 9/2014 | Drucker | ............... | G06T 13/80 345/440.2 |
| 2014/0370484 A1* | 12/2014 | Hermosura | ............. | G09B 5/06 434/350 |
| 2015/0161805 A1* | 6/2015 | Glazer | .................. | H04L 67/10 345/441 |
| 2016/0104311 A1* | 4/2016 | Allyn | ................. | G06F 17/3012 345/473 |

OTHER PUBLICATIONS

EgdeSpring Legacy Content, (approx. 2012), 97 pages.

Davis, Chris, Graphite Documentation Release 0.10.0, Sep. 16, 2014, 135 pgs.

GitHub exbz Description of Graphite UI, 2014, 13 pgs. [Retrieved Sep. 16, 2014 3:06:56 PM], Retrieved from Internet: <https://github.com/ezbz/graphitus>.

ExactTarget, "The Future of Marketing Starts Here", Mar. 1, 2013, [retreived Mar. 1, 2013], Retrieved from Internet <http://www.exacttarget.com>, http://web.archive.org/web/20130301133331/http://www.exacttarget.com/>.

Agrawala, Maneesh, "Animated Transitions in Statistical Data Graphics", 3 pgs, Sep. 22, 2009, [Retrieved Sep. 12, 2014 9:00:30 AM] Retrieved from Internet <https://www.youtube.com/watch2v=vLk7mlAtEXl&feature=youtu.be>.

Segel, Edward et al. "Narrative Visualization: Telling Stories with Data", Mar. 31, 2010, http://vis.stanford.edu/papers/narrative, 10 pgs.

Heer, Jeffrey, et al., "Animated Transitions in Statisical Data Graphics", Mar. 31, 2007, 10 pgs.

Demiralp, C., et al., "Visual Embedding, A Model for Visualization", Visualization Viewpoints, IEEE Computer Graphics and Applications, Jan./Feb. 2014, p. 6-11.

Stanford Vis group / Papers, "Visualization Papers, 2014-2001", retrieved from http://vis.stanford.edu/papers on Sep. 12, 2014, 8 pages.

U.S. Appl. No. 14/512,258—U.S. Non-provisional Application titled "Visual Data Analysis with Animated Informaiton al Morphing Replay", inventors: Didier Prophete and Vijay Chakravarthy, filed Oct. 10, 2014, 56 pages.

"Salesforce Analytics Cloud Implementation and Data Integration Guide", Summer '14 Pilot—API version 31.0, last updated: Sep. 8, 2014, 87 pages.

U.S. Appl. No. 14/512,230—"Row-Level Security Integration of Analytical Data Store with Cloud Architecture", inventors Donovan Schneider et al., filed Oct. 10, 2014, 39 pages.

U.S. Appl. No. 14/512,240—"Low Latency Architecture with Directory Service for Integration of Transactional Data System with Analytical Data Structures", inventors: Donovan Schneider et al., filed Oct. 10, 2014, 35 pages.

U.S. Appl. No. 14/512,249—"Integration User for Analytical Access to Read Only Data Stores Generated from Transactional Systems", inventors Donovan Schneider, et al., filed Oct. 10, 2014, 35 pages.

U.S. Appl. No. 14/512,263—"Declarative Specification of Visualization Queries, Display Formats and Bindings", inventors Didier Prophete et al., filed Oct. 10, 2014, 58 pages.

U.S. Appl. No. 14/512,267—"Dashboard Builder with Live Data Updating Without Exiting an Edit Mode", Inventors: Didier Prophete et al., filed Oct. 10, 2014, 55 pages.

"Occasionally Connected Applications (Local Database Caching)", downloaded on Sep. 11, 2014, from http://msdn.microsoft.com/en-us/library/vstudio/bb384436(v=vs.100).aspx, 3 pages.

U.S. Appl. No. 14/512,274—"Offloading Search Processing Against Analytic Data Stores", Inventors Fred Im et al., filed Oct. 10, 2014, 40 pages.

Dumas et al., "Stuff I've Seen: A System for Personal Information Retrieval and Re-Use," SIGIR '03 (2003), Available at: ACM, pp. 8.

\* cited by examiner

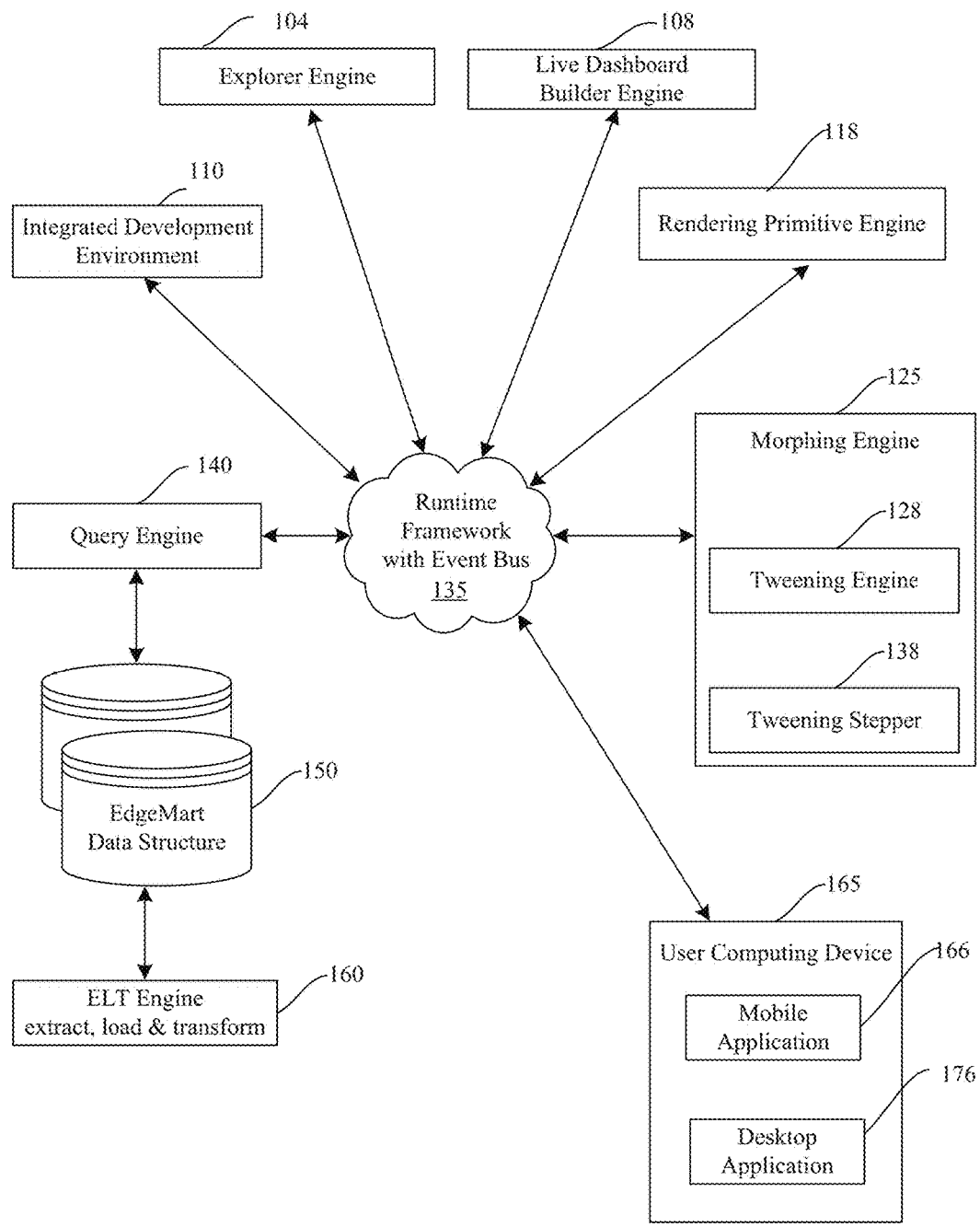
FIG. 1 – Secure Unified Charting Environment

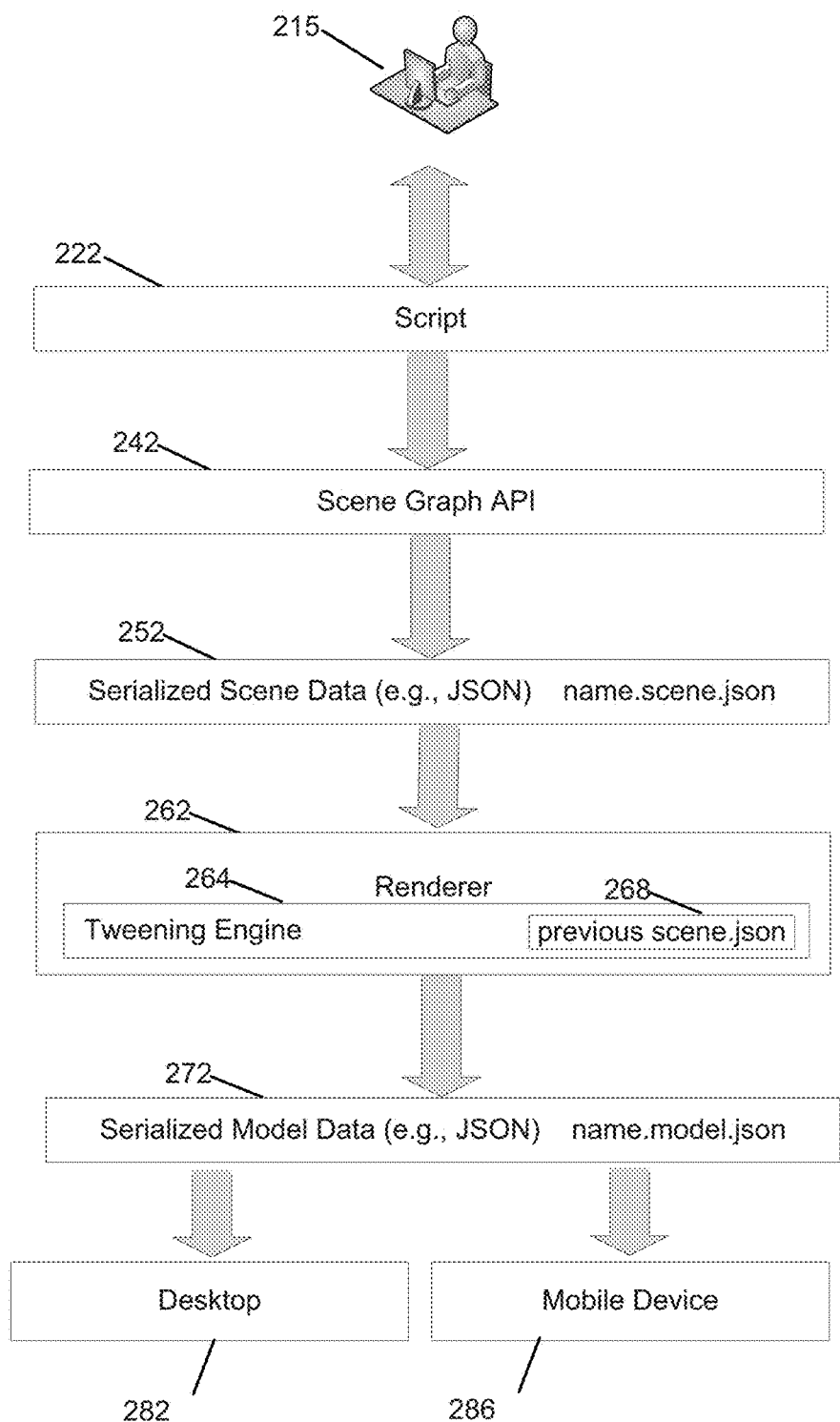
FIG. 2 Block Diagram

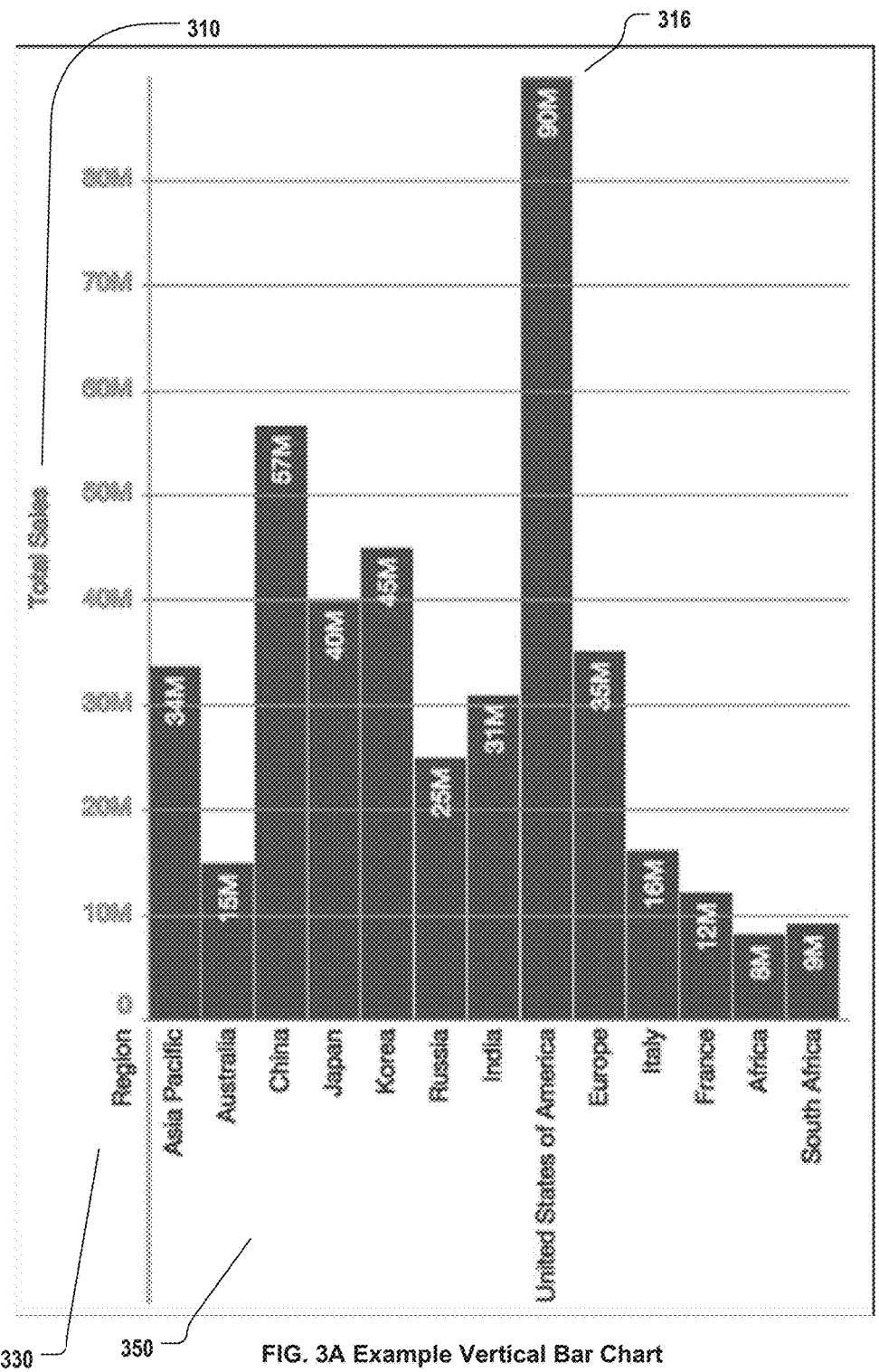
FIG. 3A Example Vertical Bar Chart

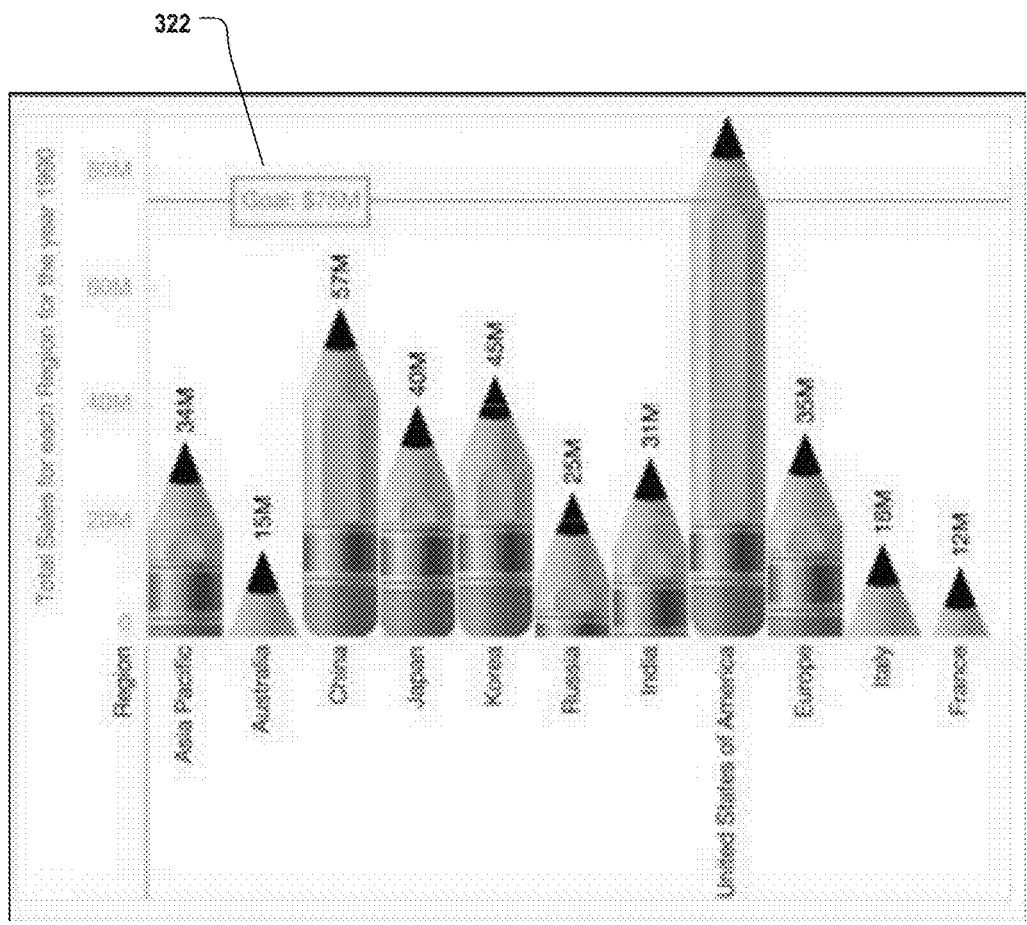
FIG. 3B Example Infographic in Chart

```
var chart = EclairNG.chart({
        size: [ 600, 600 ]
});

var config = {
  measure: {
    fields: [
        {
        column: "sumAmount",      ⎯ 410
        label: "Total Sales"
        }
    ]
  },
  dimension: {
    fields: [
        {                          ⎯ 430
        column: "Region",
        label: "Region"
        }
    ]
  },
  markColor: "#44a",
  transforms: {           ⎯ 440
    rotate: true
  }
};               ⎯ 450 var rows = [
    {"Region": "Asia Pacific" , "numOpps": 14402 , "sumAmount": 33593967},
    {"Region": "Australia" , "numOpps": 10000 , "sumAmount": 14829767},
    {"Region": "China" , "numOpps": 73273 , "sumAmount": 56593967},
    {"Region": "Japan" , "numOpps": 33243 , "sumAmount": 39829767},
    {"Region": "Korea" , "numOpps": 59373 , "sumAmount": 44829767},
    {"Region": "Russia" , "numOpps": 13273 , "sumAmount": 24829767},
    {"Region": "India" , "numOpps": 42933 , "sumAmount": 30829222},
    {"Region": "United States of America" , "numOpps": 84000 , "sumAmount": 89593967},
    {"Region": "Europe" , "numOpps": 72781 , "sumAmount": 35033967},
    {"Region": "Italy" , "numOpps": 19402 , "sumAmount": 16033967},
    {"Region": "France" , "numOpps": 13781 , "sumAmount": 12033967},
    {"Region": "Africa" , "numOpps": 7422 , "sumAmount": 8033967},
    {"Region": "South Africa" , "numOpps": 6273 , "sumAmount": 9033967}
];

chart.render('sfdc/charts/bar.js', config, rows);
                                  ⎯ 470
```

FIG. 4 Example Script to Invoke Bar Chart with Custom Parameters

```
return function(config, rows) {
    var defaultConfig = {                    ⟵ 510
        mode: constants.CHART_MODE.CLUSTER,
        markSize: constants.MARK.BAR.SIZE,
        markSpacer: constants.MARK.BAR.SPACER,
        markColor: constants.MARK.BAR.COLOR,
        showValues: true
    };
    _.defaults(config, defaultConfig);          ⟵ 530
    return imports.sceneBuilder.draw({
        config: config,
        rows: rows,
        layout: "AxisLabels",                   ⟵ 540
        plot: function(config, rows, scene) {
            var measure = config.measure.fields[0];
            var dimensions = (config.dimension && config.dimension.fields) || [];
            var color = config.color && config.color.fields[0];
            var mode = config.mode;

var markSize = Math.max(constants.MARK.BAR.MIN_SIZE,
config.markSize);
            var markSpacer = Math.max(constants.MARK.BAR.MIN_SPACER,
config.markSpacer);
            var markColor = config.markColor;

var keyFields = dimensions, labelFields = dimensions, foldField;
            if (color) {
                keyFields = utils.uniqueFields(dimensions, color);
                if (mode === constants.CHART_MODE.CLUSTER ) {
                    labelFields = keyFields;
                } else {
                    labelFields = utils.withoutField(keyFields, color);
                    foldField = color;
                }
            } else {
                mode = constants.CHART_MODE.CLUSTER;
            }
            var stack = (mode === constants.CHART_MODE.STACK);
            // Scene
            var labelsCell = scene.cellByKey("labels");
            var headerCell = scene.cellByKey("header");
570 ⟶     var plotCell = scene.cellByKey("plot");
            var axisCell = scene.cellByKey("axis");
            // Scale: color
            var colorScale = color ? utils.computeColorScale(color, rows) :
scales.constant().range(measure.color || markColor);
```

FIG. 5 Javascript for Bar.js – part 1 of 3

```
610 ─┐    // Scale: labels - fold rows so that each row maps to a label row
     │    var foldedRows = utils.foldRows(rows, labelFields, foldField, measure);
          // - compute offset, spacer for labels
          var labelRowOffset, labelRowSpacer;
          switch (mode) {
                  case constants.CHART_MODE.CLUSTER:
                  case constants.CHART_MODE.STACK:
                          labelRowOffset = markSize;
                          labelRowSpacer = [ markSpacer, 10, 15, 20];
                          break;
                  case constants.CHART_MODE.SPREAD:
                          labelRowOffset = colorScale.domain().length * (markSize +
markSpacer);
                          labelRowSpacer = [ 10, 15, 20];
                          break;
630 ─┐    }
     │    // - compute labels scale
          var labelsScale = utils.computeLayoutScale(foldedRows, labelFields, { offset:
labelRowOffset, spacer: labelRowSpacer });
          //Layer: labels
          imports.axis
                  .yLabels({
                          cell: labelsCell,
                          headerCell: headerCell,
                          rows: foldedRows,
                          fields: labelFields,
650 ─┐                    scale: labelsScale.offset(labelRowOffset / 2)
     │            });
          // Layer: bars
          var plotLayer = new Layer({ key: "bars", cell: plotCell, canSelect: true,
highlightOnHover: true });
          var yFct = utils.getValueFct(labelFields);
          var measureFct = utils.getValueFct(measure);
          var keyFct = utils.getValueFct(keyFields);
          var colorFct = utils.getValueFct(color);
          var formatter = utils.formatNumber(measure.format, true);
          var relevantColumns = _.pluck(utils.uniqueFields(labelFields, foldField, measure),
"column");
          rows.forEach(function(row){
                  new Rect({
                          layer: plotLayer,
                          key: keyFct(row),
                          x: 0,
                          y: labelsScale.scale(yFct(row)),
                          h: markSize,
                          w: measureFct(row),
                          fill: colorScale.scale(colorFct(row)),
                          text: config.showValues ? formatter(measureFct(row)) : "",
                          stack: stack,
                          data: _.pick(row, relevantColumns)
                  });
          });
```

FIG. 6 Javascript for Bar.js – part 2 of 3

```
720 ─┐    plotLayer
          .groupBy(labelFields)
          .forEach(function(group){
              group.applyLayout(stack ? { type: "stackX", cumulativeProp: "w" }
: { type: "vbox", spacer: markSpacer });
          })
          .fitInCell({ x: "LinearScale", xDomain: measure.domain, xRefLines:
measure.referenceLines });

740 ─┐    // make sure plotCell doesn't stretch all the way down if we just have a few bars
          scene.adjustRowToFit(plotCell.row);

// Layer: axis
          imports.axis
760 ─┐        .xNumbers({
                  cell: axisCell,
                  scale: plotLayer.scales.x,
                  gridLineLength: plotCell.h,
                  format: measure.format,
                  refLines: measure.referenceLines,
                  title: utils.defaultText(measure.label, measure.column)
              });
          }
      });
};
```

FIG. 7 Javascript for Bar.js – part 3 of 3

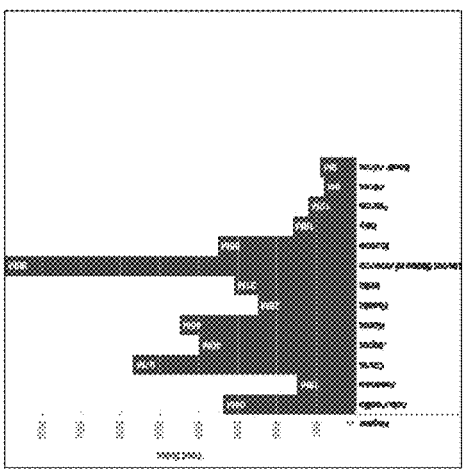
FIG. 8A Bar Graph Animation 1 of 6
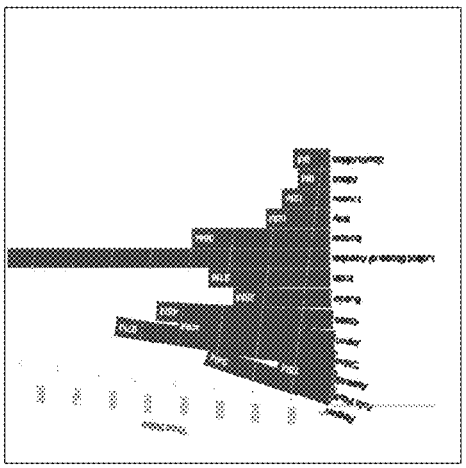
FIG. 8B Bar Graph Animation 2 of 6
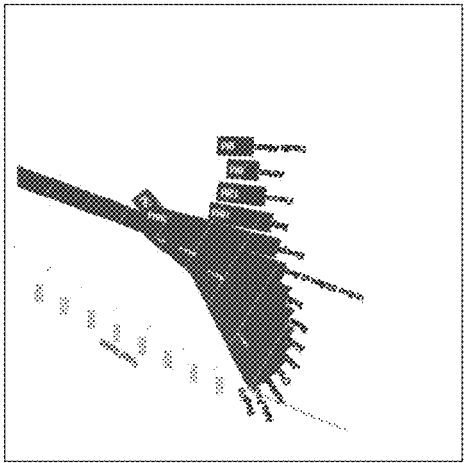
FIG. 8C Bar Graph Animation 3 of 6
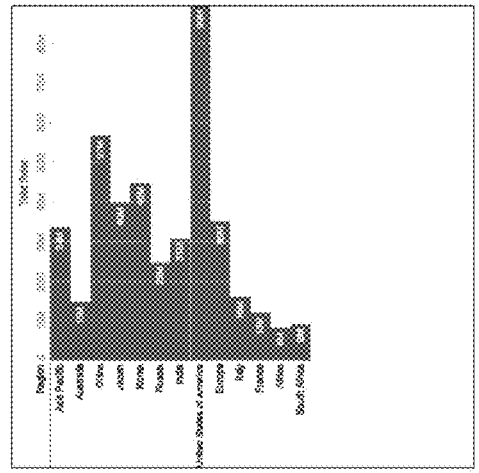
FIG. 8D Bar Graph Animation 4 of 6
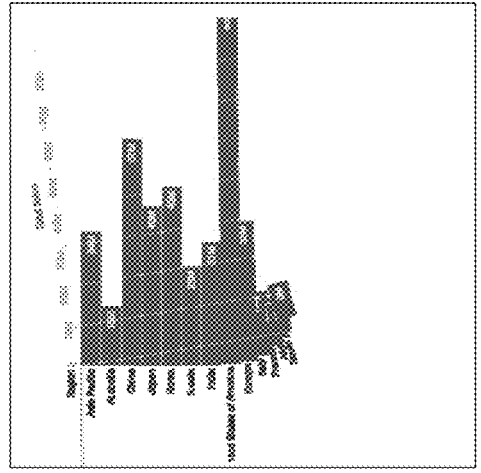
FIG. 8E Bar Graph Animation 5 of 6
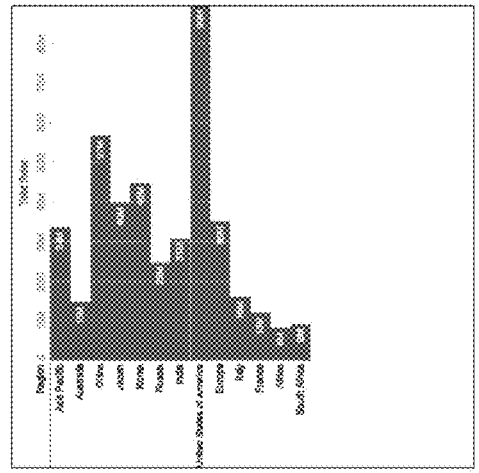
FIG. 8F Bar Graph Animation 6 of 6

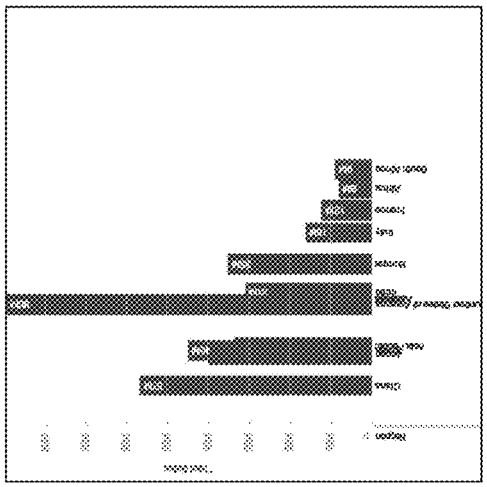
FIG. 9A Bar Order Animation 1 of 6
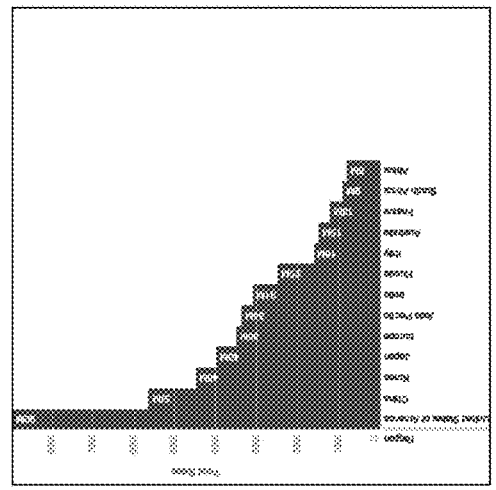
FIG. 9C Bar Order Animation 3 of 6
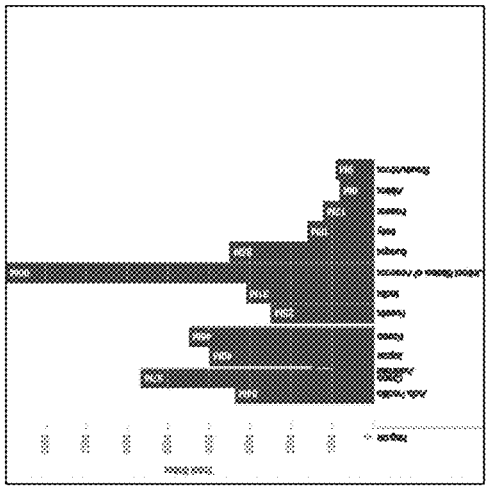
FIG. 9B Bar Order Animation 2 of 6
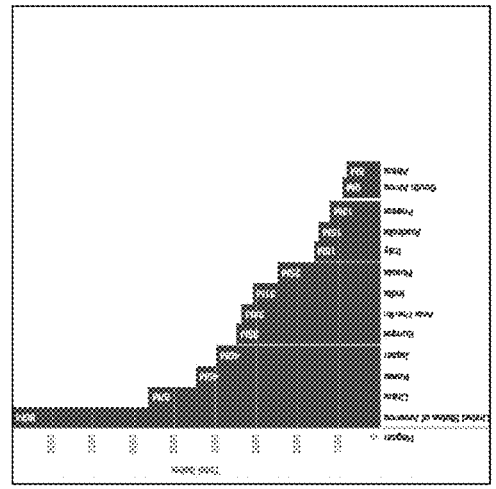
FIG. 9E Bar Order Animation 5 of 6
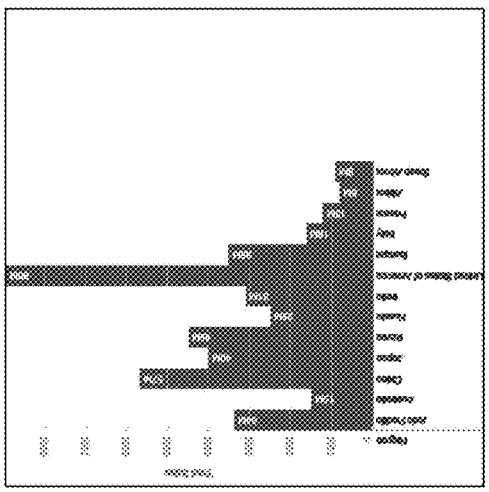
FIG. 9D Bar Order Animation 4 of 6
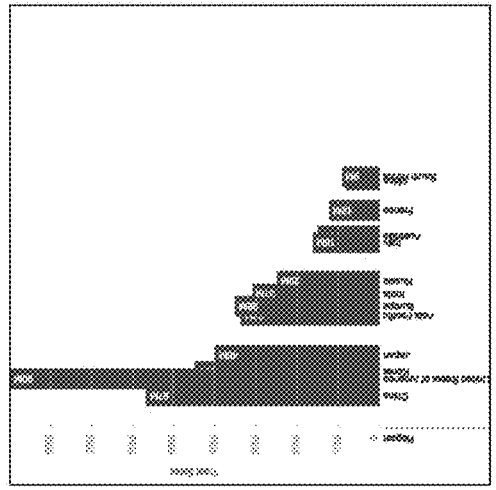
FIG. 9F Bar Order Animation 6 of 6

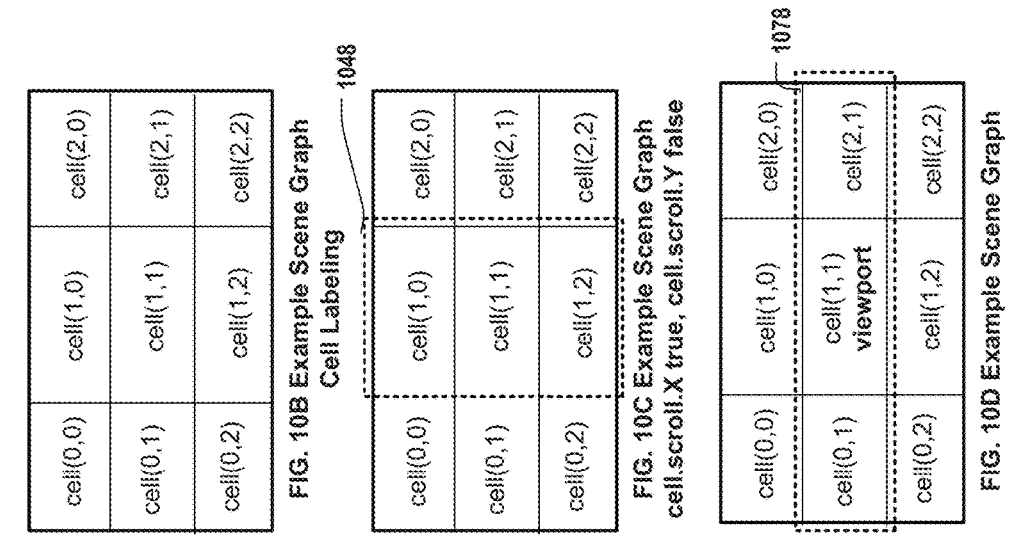
FIG. 10B Example Scene Graph Cell Labeling
FIG. 10C Example Scene Graph cell.scroll.X true, cell.scroll.Y false
FIG. 10D Example Scene Graph cell.scroll.X false, cell.scrollY true
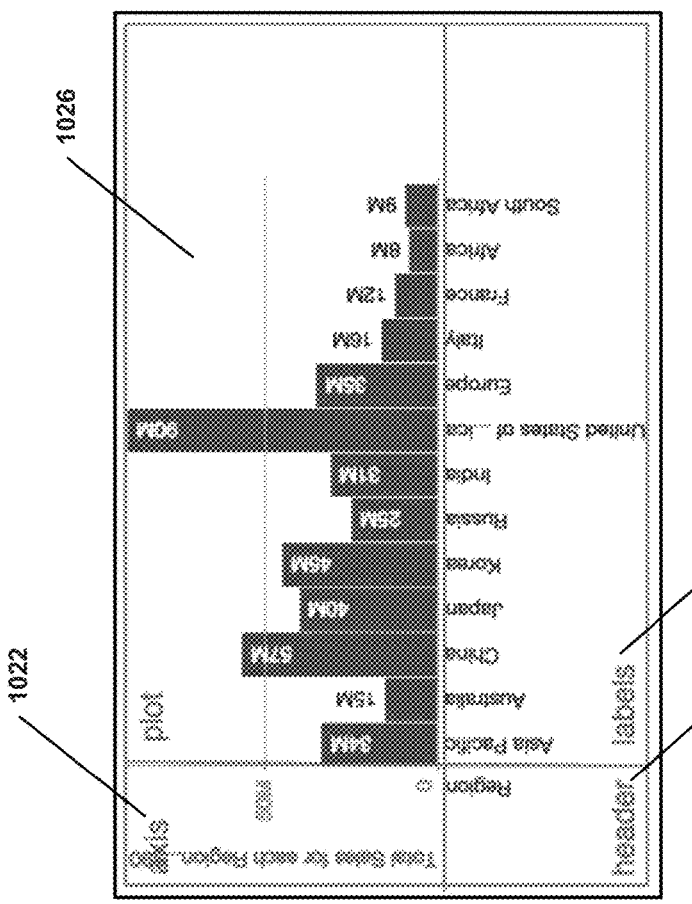
FIG. 10A Layout Template Example

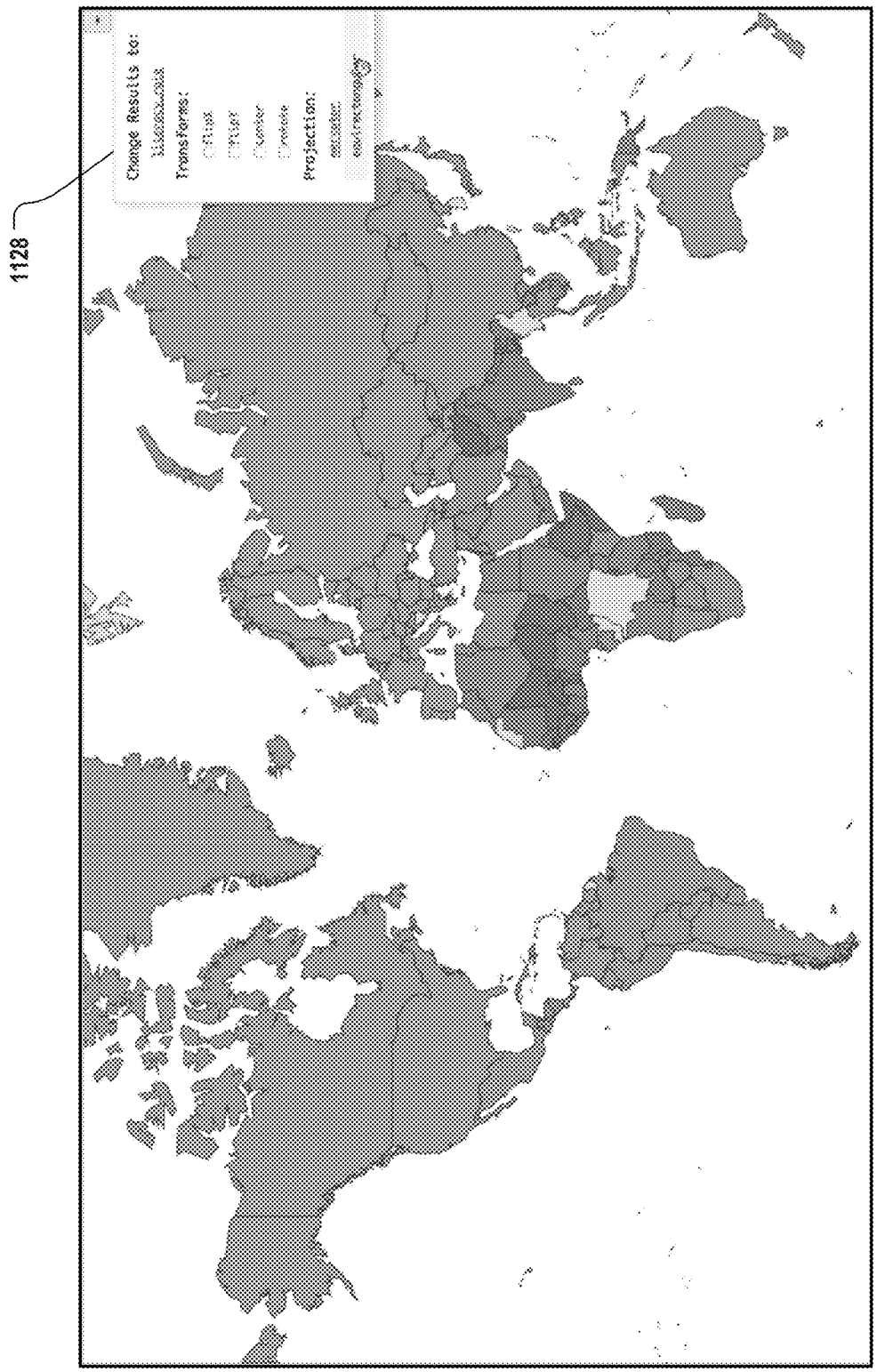
FIG. 11 Mercator Map Example

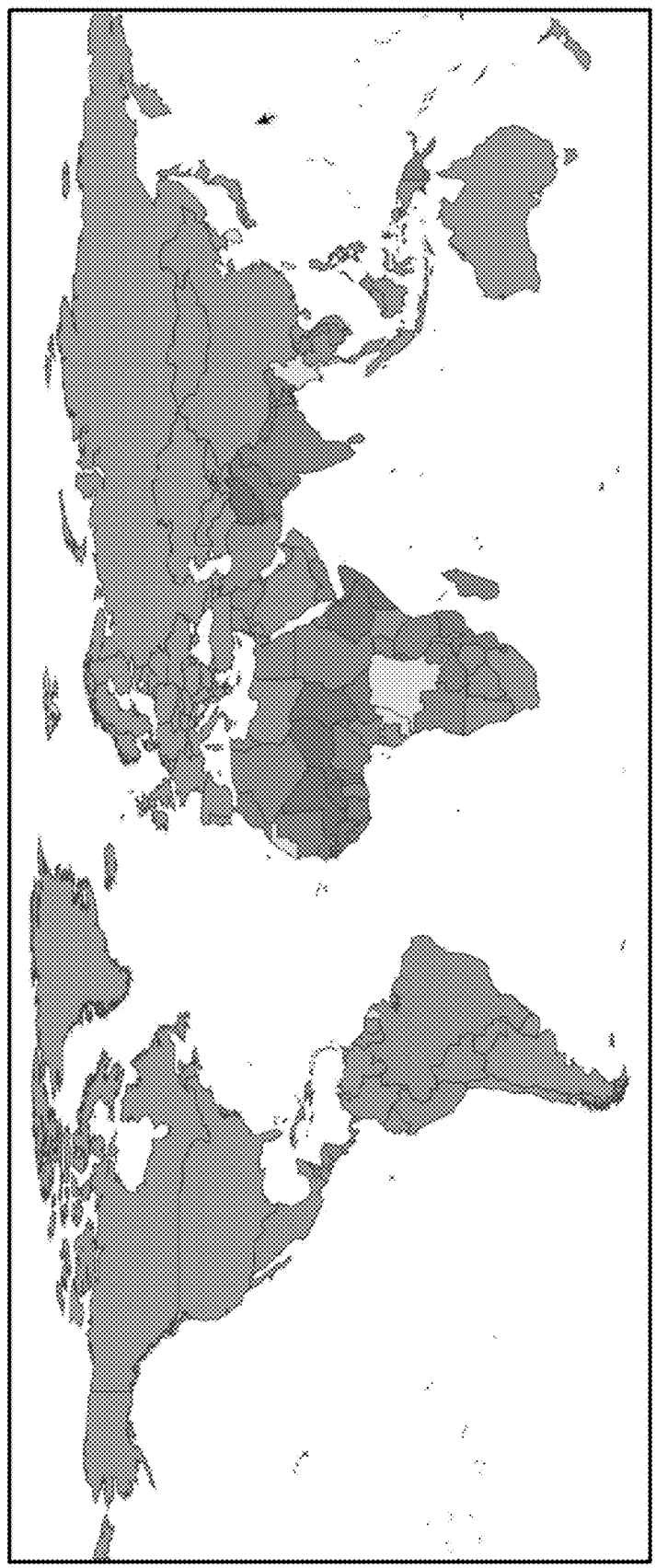
FIG. 12 Equirectangular Map Example

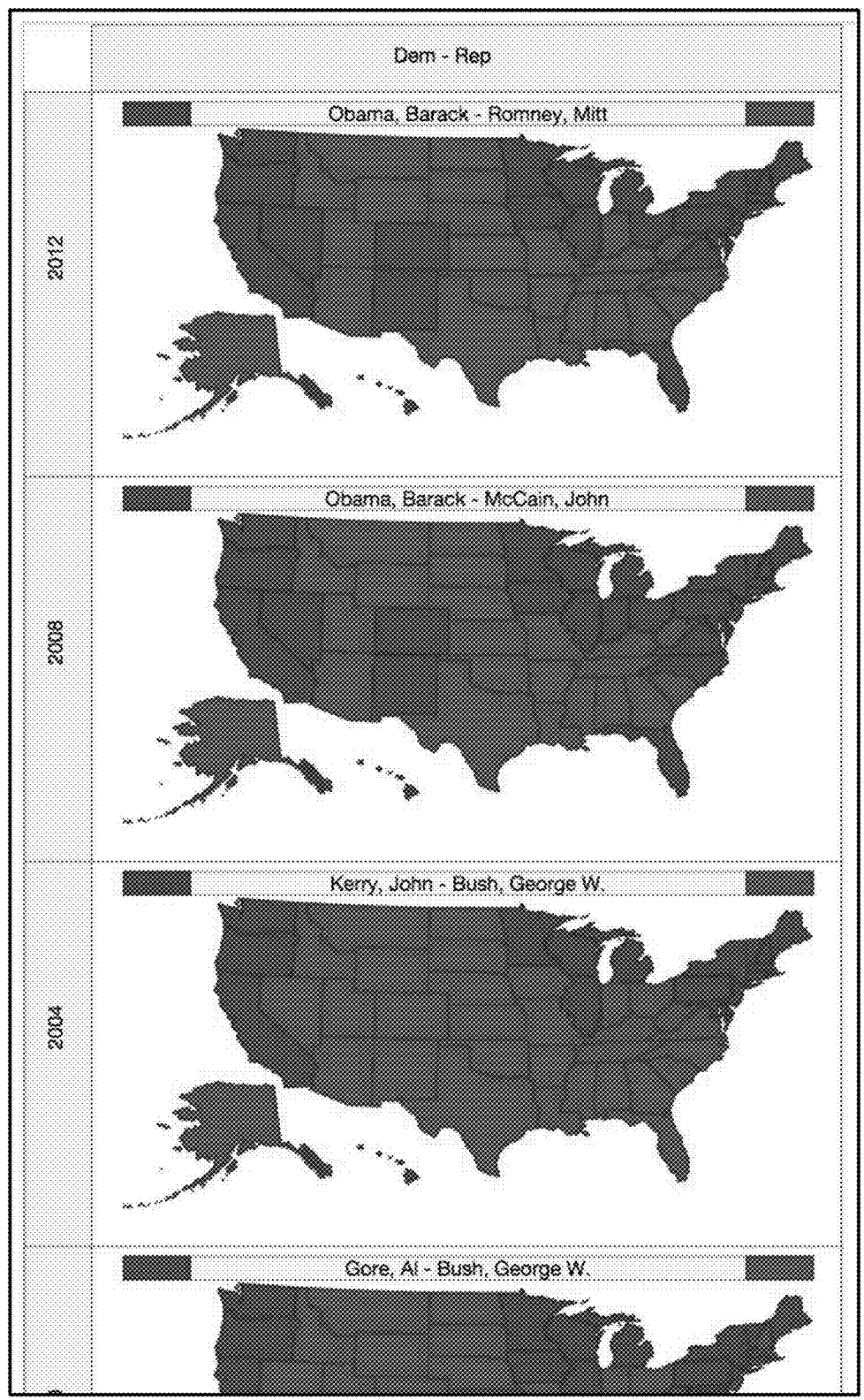
FIG. 13 Example Map of Presidents by Red and Blue States

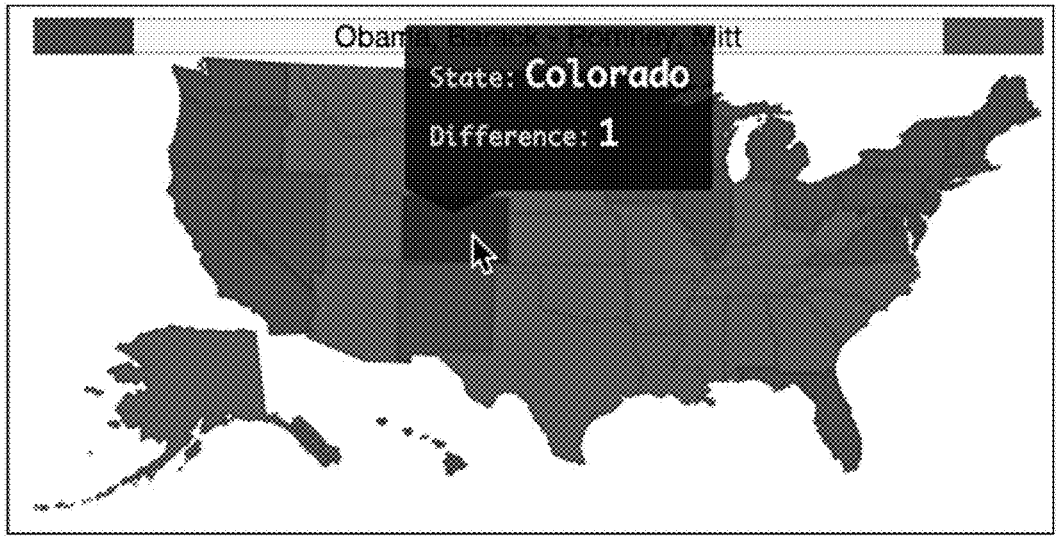
FIG. 14A Example Blue State Popup Info
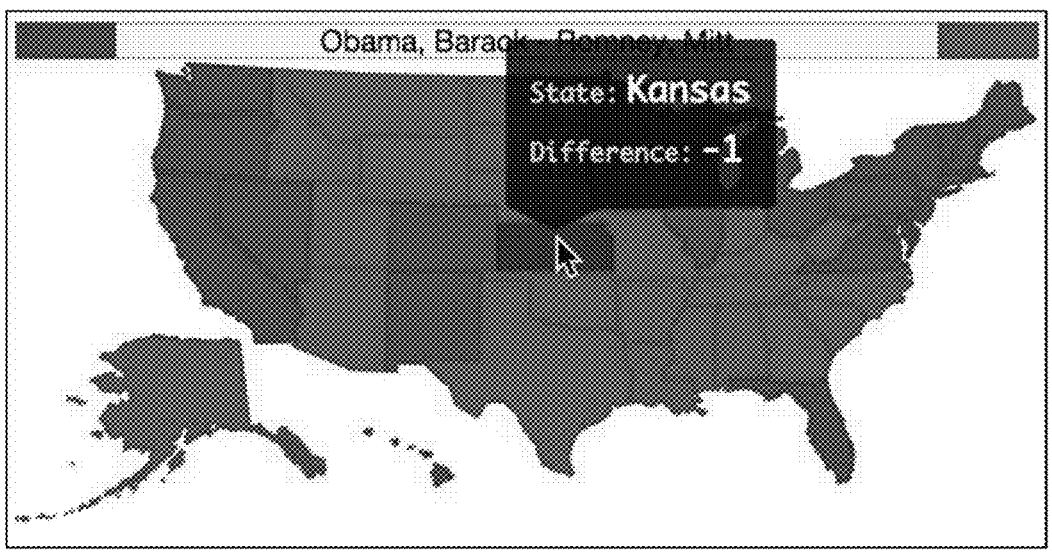
FIG. 14B Example Red State popup Info

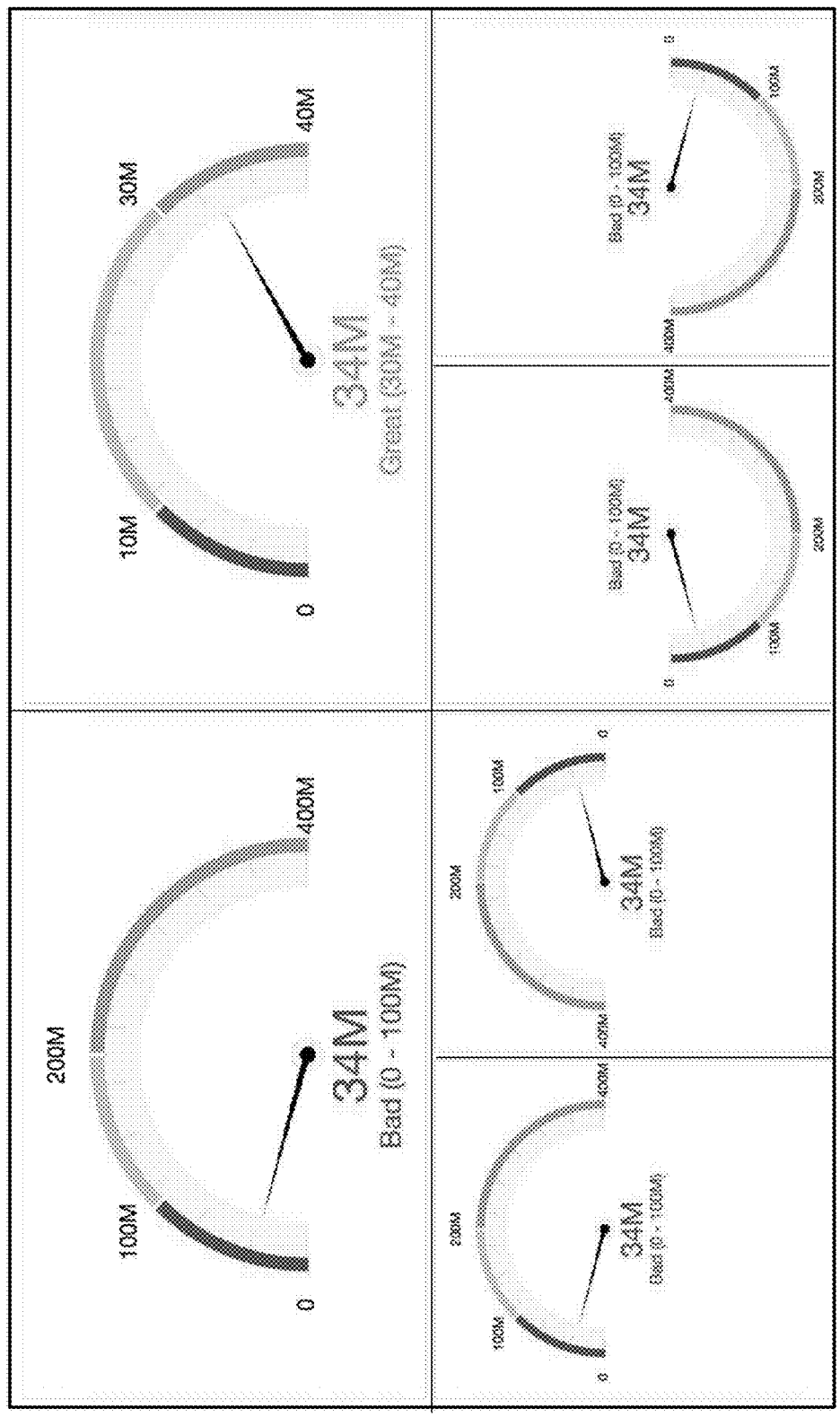
FIG. 15 Six Gauge Charts Examples

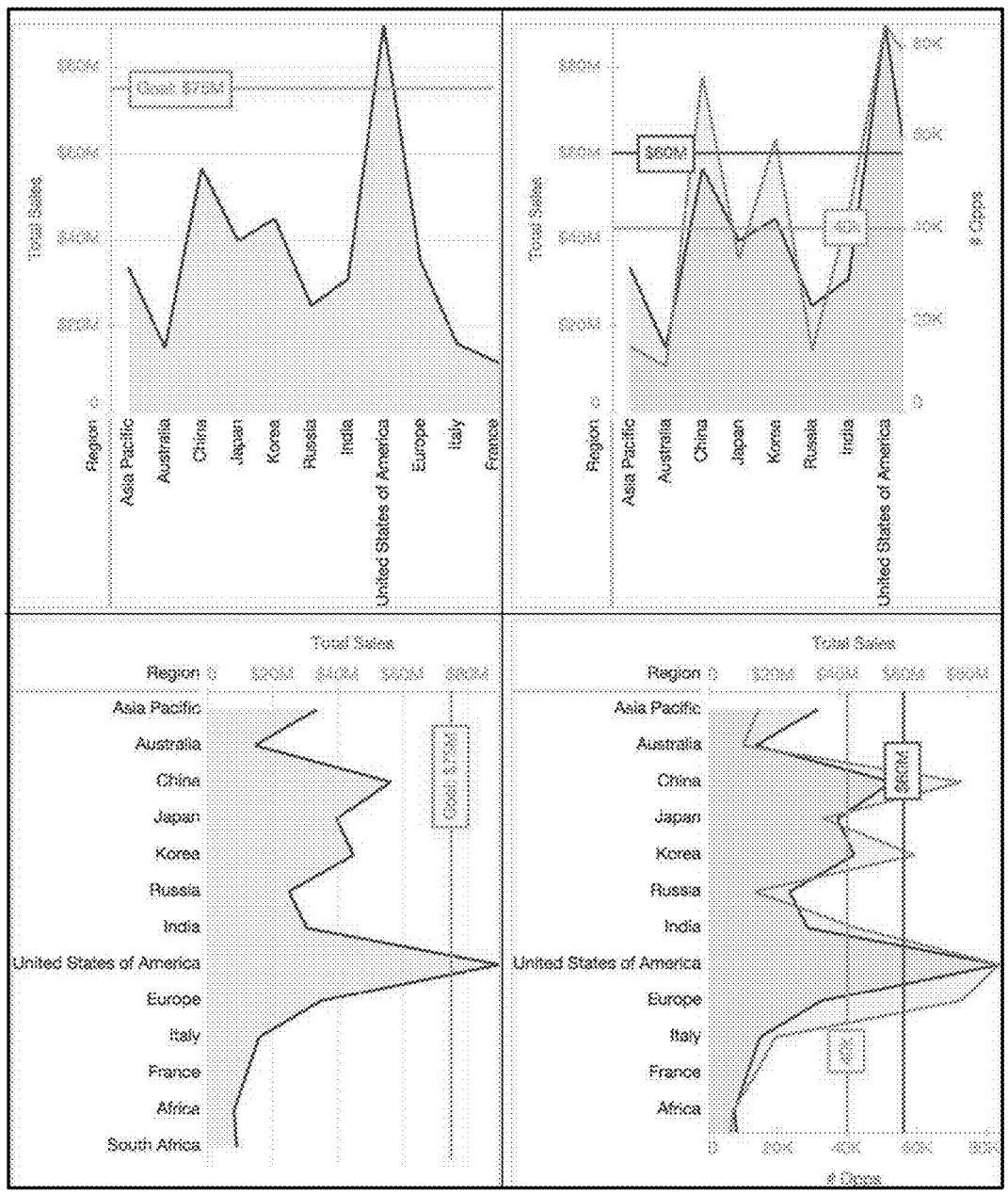
FIG. 16 Four Line Chart Examples

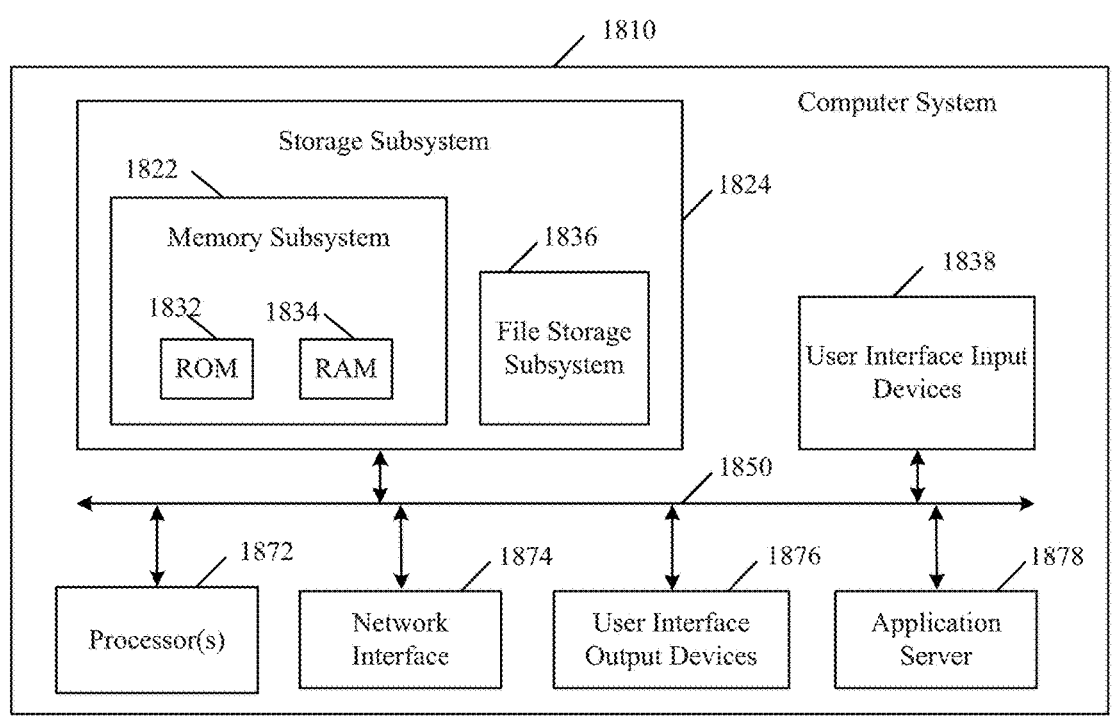
FIG. 18 Computer System

SECURE ISOLATION OF SCRIPTING FROM NATIVE GRAPHIC RENDERING OF ANIMATED DATA VISUALIZATIONS

RELATED APPLICATIONS

This application is a Continuation-in-Part of U.S. patent application Ser. No. 14/853,727, entitled "SECURE ISOLATION OF SCRIPTING FROM NATIVE GRAPHIC RENDERING OF ANIMATED DATA VISUALIZATIONS," by Didier Prophete and Yenan Chen, filed Sep. 14, 2015. The priority application is incorporated herein by reference.

This application is also related to U.S. patent application Ser. No. 14/512,258, entitled, "Visual Data Analysis with Animated Informational Morphing Replay," filed on Oct. 10, 2014 and to U.S. patent application Ser. No. 14/598,157, entitled, "Deep Linking and State Preservation via a URL," filed on Jan. 15, 2015. These two non-provisional applications are hereby incorporated by reference for all purposes.

FIELD OF DISCLOSURE

The disclosed technology includes systems and methods for secure isolation of scripting from graphical representations in a unified charting framework. A disclosed recursive cell-based hierarchy for data visualizations in a unified charting framework makes it possible to target multiple platforms—generating data visualization representations that can run natively on both desktop and mobile devices.

One of the challenges of delivering raw charting and graphic power to users has been to isolate script processing for charting in a secure environment. It can be particularly challenging to provide a secure interface to low-level graphic APIs. The technology disclosed includes a Scene Graph API for script processing and a Renderer API for graphic data processing. Security and performance are enhanced by passing serialized JSON-based or other data, not script format, data structures from Scene Graph to Renderer. Passing data is more secure than passing code to a high performance component such as the Renderer API. Rendering performance of the Renderer API can be enhanced by requiring less checking for maliciousness.

Insight data analysis supports data exploration, dashboard building, and declarative representation of data visualizations. The disclosed unified charting framework is useful for customer support, to serve the needs of business analytics users who impose systematic structure on their data. Scripting allows a technically-inclined admin, with macro programming skill level, to create arbitrary annotations of charts generated from data. Scripting also allows data transformation and coding within a chart, to derive statistics without adding columns to the data.

The disclosed technology merges the worlds of gaming and business intelligence (BI)—to deliver fast, interactive, desktop and mobile applications. The unified charting framework makes it possible to target multiple platforms with different operating systems—creating customized data visualization representations once, that can run natively, on both desktop and mobile devices. Performance of visualization representations delivered via the disclosed technology—running natively on desktop and mobile device platforms—far exceeds performance of visualization representations delivered in html via browsers on web-based platforms.

An opportunity arises to provide secure isolation of scripting from graphics, via a recursive cell-based hierarchy for data visualizations in a unified charting framework that can be accessed by customer support admins to customize visualizations, and that provides a secure interface to low-level graphic APIs.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates one implementation of a secure unified charting framework environment.

FIG. 2 shows a block diagram of a secure unified charting framework.

FIG. 3A shows an example vertical bar chart generated using the unified charting environment.

FIG. 3B shows an example infographic generated using the unified charting environment.

FIG. 4 shows an example script of an application to invoke the bar chart script with custom parameters.

FIG. 5. FIG. 6 and FIG. 7 shows bar chart script bar.js, which is invoked by the script shown in FIG. 4.

FIG. 8A, FIG. 8B, FIG. 8C, FIG. 8D, FIG. 8E, and FIG. 8F show a bar graph animation progression, changing color, position and rotation.

FIG. 9A, FIG. 9B, FIG. 9C, FIG. 9D, FIG. 9E, and FIG. 9F show a bar graph animation progression, changing bar graph order.

FIG. 10A illustrates a layout template that includes a bar chart, with header and labels.

FIG. 10B shows example scene graph cell labeling.

FIG. 10C shows a viewport scroll example for a scene graph with cell.scroll.X true and cell.scroll.Y false.

FIG. 10D shows a viewport scroll example for a scene graph with cell.scroll.X false and cell.scroll.Y true.

FIG. 11 is an example Mercator map that shows literacy rates around the world, with dropdown options for transformations and projections—generated using the unified charting framework.

FIG. 12 shows an example equirectangular map visualization that shows literacy rates around the world—generated using the unified charting framework.

FIG. 13 is an example map that shows presidents by red and blue states—generated using the unified charting framework.

FIG. 14A shows example blue state popup information, based on a customized script.

FIG. 14B shows example red state popup information, based on a customized script.

FIG. 15 illustrates six gauge chart examples that can be generated using the unified charting framework.

FIG. 16 illustrates line chart options available in the unified charting framework.

FIG. 18 is a block diagram of an example computer system for a secure unified charting framework.

DETAILED DESCRIPTION

Figure 17:
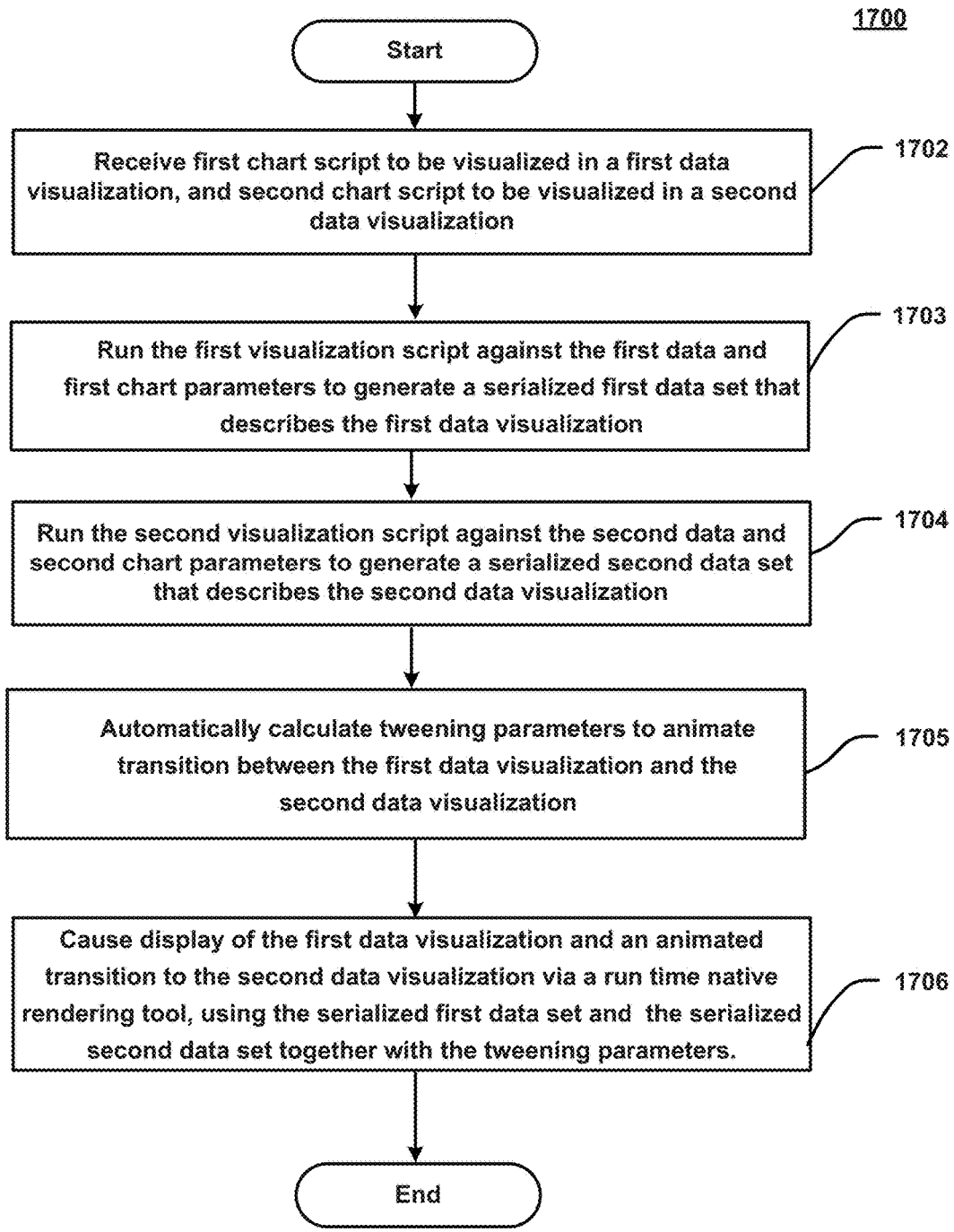
FIG. 17 is an example workflow for secure isolation of scripting from graphics.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

Insight data analysis supports data exploration, dashboard building, and declarative representation of data visualizations. During exploration and replayed exploration, changes in data filtering, grouping and presentation format are animated, showing how a change redistributes data values. Singularly and in combination, these features can contribute to successful data analysis and presentation.

During single panel data exploration and replay, new data visualizations are animated as they are designed. Drilling down on a data segment, for instance, causes the original data segment to subdivide according to the selected regrouping and visually progress through animated subdivision growth and rearrangement into a more granular data visualization. This helps the analyst understand the data, and subsequently, explain important data segments to colleagues who are interested in the process as well as the numbers.

Analysts can assemble dashboards of three or more charts that provide alternative visualizations of linked data. As an analyst creates a new chart, the system immediately applies the declared queries, widgets and bindings to the Edge Mart(s) involved to generate data visualizations. Notional or generic representations of pie and bar charts are replaced when applying this technology by live data visualizations, without requiring a user to switch from authoring/editing mode into an execution or user mode. (In this disclosure, "pie" and "donut" are used interchangeably to refer to a circular chart with wedges or segments. We recognize that many readers would call the charts in the figures donuts instead of pies.)

An assembled dashboard can be compactly represented by declarative data objects that fully describe charts by their properties. A widget that implements a chart is capable of translating the declarative data object into a data visualization. A selected widget, such as a pie chart widget, has a handful of properties that control how the widget binds to a query and displays data.

Exploration, both original and replay, benefits from animated visualization. Consider drill down and regrouping as a first example. Consider regional win rates on sales proposals worldwide. If Asia Pacific has the best success, an analyst can drill down into the Asia Pacific data several different ways to see what drives success. The analyst looks at a pie chart, for instance, and selects the Asia Pacific segment, choosing to group the data by industry type, with the bar chart visualization. The system responds by subdividing the Asia Pacific arc by industry type and animating the projection of sub-arcs into the bars of a bar chart. The sub-arcs lengthen, straighten and reposition during the animation. The analyst can see in the animation how the industry type bar chart visualization is derived from the regional data. The animation speed can be delivered more slowly or quickly, as suits the circumstances.

The system generates declarative data objects to represent the visualizations, both for replay of data exploration and for dashboards. Dashboards and exploration sequences can be recreated from declarative objects that represent the queries, visualizations, groupings and bindings explored by an analyst-author. Declarative objects specify properties to be applied and values of the properties. A single scene or a dashboard of scenes is represented by a set of declarative objects. Declaration of these objects allows the runtime to create a limited but powerful set of data visualizations during exploration, creation, replay and user dashboard viewing. The vocabulary for declarative data objects is manageable because the declarative objects are special purpose with options capable of specifying queries, bindings and facets that the provided widgets understand and can consume to produce specific data visualizations. Properties of declarative objects can be specified using key-value pairs, as illustrated in the text that follows.

Historically, available charts for scenes have been delivered by development engineers who have provided a limited but powerful set of data visualizations. Meanwhile, customers, who are not necessarily developers, want to be able to add information. For example, in one use case a marketing manager wants to include a line on a sales graph that shows 75% of sales, as an incentive to her sales staff.

An opportunity arises to make available a unified charting framework that includes a script-based system for customers, who can start with a script of primitive shapes with property representations that are usable to generate a "vanilla" chart, and they can customize visualizations for their needs. The disclosed framework technology extracts the chart layer and makes it generic so customers can develop their own charts—making visualizations customizable while providing a secure interface to low-level graphic APIs. Example visualizations can also be used for system testing of updates to the development environment.

The disclosed unified charting framework can be rendered natively on multiple platforms that run different operating systems. That is, scripts for visualizations can be written once and used on both mobile device and desktop applications. Customers can start with a script that creates a chart using base level shapes. The scene graph API engine knows how to animate charts—including primitive shapes, and implementing tweening features such as scrolling and sizing, automatically. Because the unified charting framework is script-based, customers can modify representations of shapes and charts to add features to visualizations, such as stacking bars, adding a line to an existing chart, rotating views, etc. Shapes that represent data regions are composed of complete arcs or bars. For example, an arc has a stroke that is the outline of the region to be visualized, and it has additional properties such as an associated fill value. Using the framework, arcs can be stacked; and patterns such as stacking can be shared across visualizations, using layers.

Scripting can be isolated from native graphic engine rendering of animated data visualizations, for increased security. A run time script processing tool can receive a first output of first selected data to be visualized in a body of a first scene, first chart parameters defining visualization chart elements in the first scene, and a first static visualization script that produces a first data visualization of the first selected data. Additionally, the script processing tool can receive a second output of selected data to be visualized in a body of a second scene, second chart parameters defining visualization chart elements in the second scene, and a second static visualization script that produces a second data visualization of the second selected data. The script processing tool can run the first static visualization script against the first data and first chart parameters in the first output to generate a serialized first data set that describes the first data visualization as shapes that represent data regions of the chart and other chart components. The run time processing tool can also run the second static visualization script against the second data and second chart parameters in the second output to generate a serialized second data set that describes the second data visualization as shapes that represent data regions of the chart and other chart components, automatically calculating tweening parameters to animate transition between the first data visualization and the second data visualization. Further, the script processing tool can cause display of the first data visualization and then of an animated transition from the first data visualization to the second data visualization by successively passing to a run time native rendering tool the serialized first data set and then the serialized second data set together with the tweening parameters.

Examples of systems, apparatus, and methods according to the disclosed implementations are described in a "sales opportunity" context. The examples of sales contacts such as leads, prospects and accounts are used solely to add context and aid in the understanding of the disclosed implementations. In other instances, data with numerous elements may include airline flight arrival and departure times, insurance claims, customer service call routing, literacy reporting across the globe, etc. or any data that would have a significant number of features. Other applications are possible, so the following examples should not be taken as definitive or limiting either in scope, context or setting. It will thus be apparent to one skilled in the art that implementations may be practiced in or outside the "sales opportunity" context.

Architecture Environment for Secure Isolation of Scripting from Graphics

FIG. 1 illustrates one implementation of isolation of scripting from graphics in a secure unified charting environment 100, showing that environment 100 can include an integrated development environment 110 and a rendering primitive engine 118. FIG. 1 also includes a runtime framework with event bus 135 that manages the flow of requests and responses between a user computing device 165 mobile application 166 or desktop application 176, an integrated development environment 110, a query engine 140 and a rendering primitive engine 118.

Data acquired (extracted) from large data repositories is used to create "raw" EdgeMart data structures 150—read-only data structures for analytics—that can be augmented, transformed, flattened, etc. before being published as customer-visible EdgeMarts for business entities. A query engine 140 uses optimized data structures and algorithms to operate on the highly-compressed EdgeMarts 150, delivering exploration views of this data.

A disclosed live dashboard builder engine 108 designs dashboards, displaying multiple lenses developed using the Explorer engine 104 as real-time data query results. That is, an analyst can arrange display charts for multiple sets of query results from the Explorer engine 104 on a single dashboard. When a change to a global filter affects any display chart on the dashboard, the remaining display charts on the dashboard get updated to reflect the change. Accurate live query results are produced and displayed across all display charts on the dashboard.]

The EQL language is a real-time query language that uses data flow as a means of aligning results. It enables ad hoc analysis of data stored in EdgeMarts. A user can select filters to change query parameters and can choose different display options, such as a bar chart, pie chart or scatter plot—triggering a real-time change to the display chart—based on a live data query using the updated filter options. An EQL script consists of a sequence of statements that are made up of keywords (such as filter, group, and order), identifiers, literals, or special characters. EQL is declarative: you describe what you want to get from your query. Then, the query engine will decide how to efficiently serve it.

A runtime framework with an event bus 135 handles communication between a user mobile application 166 or a desktop application 176 on a user computing device 165, a query engine 140, and an integrated development environment 110, which provides a representation of animated data visualizations implemented in a hierarchy of levels including scenes, cells, layers and shapes—that can be viewed via morphing engine 125.

The morphing engine 125 receives a request from the event bus 135, and responds with a first chart or graph to be displayed on the live dashboard 115. Segments of a first chart or graph are filter controls that trigger generation of a second query upon selection by a user. Subsequent query requests trigger controls that allow filtering, regrouping, and selection of a second chart or graph of a different visual organization than the first chart or graph.

The disclosed morphing engine 125 includes tweening engine 128 and tweening stepper 138 that work together to generate pixel-level instructions—intermediate frames between two images that give the appearance that the first image evolves smoothly into the second image. That is, a shape can be described by a radius and an angle. The tweening engine 128 calculates the locations for the pixels and the tweening stepper 138 delivers an animation projection sequence for morphing a display chart from a first visualization lens to a second visualization option. The projections between the start and destination frames create the illusion of motion that gets displayed on the dashboard when a user updates data choices.

The overall display, referred to as a dashboard, can include multiple scenes, also referred to as charts. A display scene can include a live chart, selector, text or a number. In the case of a single display panel, which renders as a chart on a dashboard, the chart's internal technical representation is referred to as a scene.

Integrated development environment 110 provides a representation of animated data visualizations implemented in a hierarchy of levels including scenes, cells, layers and shapes. Shapes include rectangles, text, arcs, lines and points. Integrated development environment 110 also provides an interface for processing animation scripts that animate transitions between the shapes applied to data visualizations. Example animation transitions include scaling so that charts fit the display environment, and are not clipped; and rotations between vertical and horizontal display. Animation scripts are represented using non-procedural data structures that represent shapes to be rendered, and that represent animations of the transitions between the shapes to be rendered. In one example implementation, JSON can be used to express the generated non-procedural data structures.

Rendering primitive engine 118 transforms non-procedural data structures that represent the shapes and the animation of transitions between the shapes, into rendered graphics.

In other implementations, environment 100 may not have the same elements as those listed above and/or may have other/different elements instead of, or in addition to, those listed above.

Scene Graphs

Script writers can generate a static representation of a first chart graphic, using the disclosed unified charting environment 100 to define the chart. A chart in the scene graph of typically includes multiple cells. Scene graph data structures are used by vector-based graphics-editing applications to arrange the logical and spatial representation of the graphical scene (as described by a chart script). The scene graph includes the collection of nodes in the tree structure. A tree node in the overall tree structure of the scene graph may have many children but often only a single parent, with the effect of a parent applied to all its child nodes; an operation performed on a group automatically propagates its effect to all of its members. Related shapes and objects can be grouped into a compound object that can then be moved, transformed, selected, etc. as easily as a single object. A viewport is an area, typically rectangular, expressed in rendering-device-specific coordinates, e.g. pixels for screen coordinates, in which the objects of interest are going to be rendered. A key string represents the viewport (rectangular area). Two numbers can represent the size of a rectangle for the scene, two numbers can represent the position of the rectangle for the chart, and a number represents a size value for the chart content.

Similarly, a cell can be represented by a key string identifier, and additional properties, including two numbers that represent a relative position of the cell, an index count of a cell that sets the layer order, a set of four numbers that represent coordinates for a rectangle for the cell, a settable Boolean flag for enabling scrolling in an x direction, and a settable Boolean flag for enabling scrolling in a Y direction.

Layer properties can include a key string identifier, two numbers that represent a width and height of the cell two numbers that represent a translation of the location of the cell origin, a settable Boolean flag for enabling staggering of the animation between the shapes in the layer, and a set of three numbers that represent coordinates for scaling applied to the shapes in the layer.

The hierarchy of nodes in the unified charting framework traverses a scene node, to cell nodes, to layer nodes, to shape nodes. Each node utilizes the structure listed below.

```
_children: Array<Node>
_parent: Node
props:
type: "Scene|Cell|Layer|Text|Line..."
tx: Number
...
tweens: Object<propName: [fromValue, toValue] >
```

FIG. 2 shows the relationship between a script 222, the scene graph API 242, serialized scene data 252 and the renderer 262, which can be implemented in a native application on a desktop 282, a native application on a mobile device 286, as a web-based application in a browser window, or as web app deployed from the cloud to a thin client.

A script writer 215 selects and configures a chart type from the primitive shape representations available in the disclosed unified charting framework. Script writer 215 can also modify existing primitive shapes. Script 222 represents animated data visualizations organized in a hierarchy of levels. Scene graph API 242 processes the scripts and outputs graphic primitives as serialized scene data 252 in non-procedural-based data structures, passing data instead of commands to the renderer 262. In one example implementation, the non-procedural-based data structure can be expressed in JSON.

Renderer 262 receives the non-procedural-based data structures that represent the scene to be rendered, from scene graph API 242. If the scene has been rendered previously, tweening engine 264 includes the previous scene.json 268 as a stored chart. Tweening engine 264, in renderer 262, compares the received scene data structure to the stored previous scene.json 268, and computes the initial state and tweening instructions required to render the received scene data structure. An example chart that includes x,y position, color and rotation tweening is described below.

The disclosed unified charting framework includes handling of clipping. Clip regions improve render performance, saving time and energy by skipping calculations related to pixels that the user cannot see. Pixels that will be drawn are said to be within the clip region. Pixels that will not be drawn are outside the clip region. The disclosed framework also includes handling of scrolling for charts, in the renderer 262, and tweening—to give the appearance that a first image evolves smoothly into the second image. Additionally, the framework handles morphing—for example, an animated change from a bar chart graph to a pie chart that represents the same data.

When a user clicks on a displayed visualization scene, the desktop application or mobile application handles an event that requests an updated chart for the dashboard visualization. The customer's application handles requests for new queries and for data visualization scene changes.

Security is enhanced by sending stringified scene graphs to the renderer. Serialized scene data 252, implemented in non-procedural data structures—JSON in this example—gets passed between scene graph API 242 and renderer 262. In other example implementations, non-procedural data structures can be implemented as key-value pairs or XML name-value pairs. Rendering primitive engine 118 makes no assumptions as to how the scene graph has been constructed. The transmission of only serialized scene data 252 between scene graph API 242 and renderer 262 makes it possible to avoid communicating useable code or data that could be used by hackers to obtain proprietary information from customers.

In one implementation of the disclosed technology, serialized scene data 252 can be constructed by evaluating the script in an iFrame, and communication between scene graph API 242 and renderer 262 occurs via strings that represent the charts using non-procedural data structures. Browsers provide security when a script is evaluated in an iFrame, from which access to the main window is not available. The iFrame does not have access to the html of the main page, so scripts executed in the iFrame cannot affect the main frame. If the iFrame is served by a different domain than the company's main windows, then hackers are not able to steal a session ID from the main window and use it maliciously.

The following description and related figures explain the progression of generating a rendered chart from beginning to end, beginning with a script defined by a script writer 215. In some implementations the initial chart scripts may be stored previously for use. FIG. 3A shows an example vertical bar chart that can be rendered by renderer 262. The chart includes vertical axis label 310, horizontal axis label 330 and individual bars of data by region 350. In some implementations of the unified charting framework, customer service admins can also use images to make simple infographics, such as the pencil infographic shown in FIG. 3B, for more engaging charts. A goal line of $75M 322 highlights a relationship among the sales in the represented countries.

FIG. 4 shows an example script for invoking the bar chart script, with custom parameters to generate the bar chart shown in FIG. 3A. Label feature 410 defines the vertical axis label 310; label region feature 430 defines the horizontal axis label 330; animation transformation with color set to a specific value and rotate set to true 440, and rows 450 specify the data by region 350 for the individual bars. Chart.render 470 calls bar.js to render the chart, providing the configuration and data rows. The unified charting framework library script—bar.js—is described next.

FIG. 5, FIG. 6 and FIG. 7 show framework JavaScript for bar.js for rendering a bar chart using the disclosed unified charting framework. Default configuration 510 sets the configuration values of bar size, spacing and color constants. Scenebuilder.draw 530 uses the configuration, rows and layout for the scene. Plot: function (config, rows, scene) 540 includes detailed plotting information: measures, dimensions, color and mode. Scene 570 specifies labels, header, plot and axis information. Scale 610 folds rows so that each row maps to a label row. Compute labels scale uses labelsScale 630 to compute the layout scale. Layer bars uses plotLayer 650 to set up the plot layers for the chart. Plot layer 720 applies the group layout, fitting the plot into the specified cell. Scene.adjustRowToFit 740 ensures that the plot cell does not stretch beyond the needed space for the bars to be displayed. Layer: axis 760 imports the axis number and format and title.

Scene graph API 242 includes the list of primitive shape property representations as a contract with chart script writers. No renderer-specific assumptions are needed by the script writer using the scene graph API 242 serialized output.

Example non-procedural code for the chart scene, produced by the scene graph API 242 for the bar chart shown in FIG. 3A, includes 1010 lines of code, in vbar.scene.json, that represent the feature-value pairs that specify the details of the chart. A snippet of the non-procedural code, implemented in JSON in this example, which includes setting up header labels and axes, is listed below.

```
{
  "children": [
    {
      "children": [
        {
          "canSelect": false,
          "children": [
            {
              "children": [
              ],
              "cw": false,
              "halign": "right",
              "key": "header-Region",
              "maxWidth": 118,
              "opacity": 1,
              "size": 12,
              "stroke": "#333333",
              "text": "Region",
              "type": "Text",
              "valign": "middle",
              "vertical": false,
              "x": 0,
              "y": -12
            },
            {
              "baseXValue": 0,
              "baseYValue": 0,
              "children": [
              ],
              "key": "line",
              "lineWidth": 2,
              "opacity": 1,
              "stroke": "#c9c7c5",
              "type": "Line",
              "vertical": false,
              "x0": -113,
              "x1": 0,
              "y0": 0,
              "y1": 0
            }
          ],
          "key": "headerlabels",
          "scales": {
```

-continued

```
            "staggerAnim": true,
            "type": "Layer",
            "x": 114,
            "y": 50,
            "zIndex": 0
          }
        ],
        "column": 0,
        "h": 50,
        "key": "header",
        "row": 0,
        "scrollX": false,
        "scrollY": false,
        "type": "Cell",
        "w": 114,
        "x": 0,
        "y": 0,
        "zIndex": 0
      },
```

The following snippet of the vbar.scene.json code, produced by scene graph API 242, includes the details needed to render the bar for the 'United States of America' 316.

```
{
  "children": [
  ],
  "data": {
    "Region": "United States of America",
    "sumAmount": 89593967
  },
  "fill": "#44a",
  "h": 25,
  "key": "United States of America",
  "lineWidth": 1,
  "opacity": 1,
  "stack": false,
  "text": "90M",
  "type": "Rect",
  "vertical": false,
  "w": 181.49999999999997,
  "x": 0,
  "y": 182
},
```

FIG. 8A shows a bar graph chart. FIG. 8B, FIG. 8C, FIG. 8D and FIG. 8E show animation transitions as the bar chart transitions between a blue vertical chart and the red vertical chart shown in FIG. 8F. Tweening animation for the transition shown in FIGS. 8A through 8F includes position, color and rotation tweening, represented in the style listed below, which includes tween positions, colors and rotation information.

```
            "tweens": {
              "x": [
                26,
                0
              ],
              "y": [
                0,
                26
              ],
              "fill": [
                "#44a",
                "#C23934"
              ],
              "rotation": [
```

An example script for invoking the animation shown in FIGS. 8A through 8F is listed below. The animation shows a vertical bar chart transitioning into a horizontal bar chart.

```
var config = {
  measure: {
    fields: [
      {
        column: "sumAmount",
        label: "Total Sales"
      }
    ]
  },
  dimension: {
    fields: [
      {
        column: "Region",
        label: "Region"
      }
    ]
  },
  markColor: "#C23934" ,
  transforms: {
    rotate: false
  }
};
chart.render('sfdc/charts/bar.js', config, rows);
```

The transforms field listed above describes the transformation of the static scene. By default the static bar chart is horizontal, so the rotate value is specified as false, and the static scene JSON produced by calling 'bar.js' is a horizontal bar chart.

Continuing the animation example, renderer 262 generates rotate.animation.model.json, which includes 3278 lines of JSON that can be sent as serialized model data 272 to a native desktop application 282 or a native mobile device application 286 to render the bar chart animation shown in FIGS. 8A through 8F. A snippet of the model JSON script rotate.animation.model.json generated by the renderer 262 for invoking the rotation and color animation shown in FIGS. 8A through 8F is listed below. The snippet shows handling of the header region with text "region", with data that represents the initial state and tweening instructions.

```
"props": {
  "key": "header-Region",
  "bb": [
    -38,
    -18.6,
    37.77592468261719,
    12
  ],
  "opacity": 1,
  "type": "Text",
  "x": -9,
  "y": 38,
  "text": "Region",
  "fontSize": 12,
  "fill": "#333333",
  "rotation": -1.5707963267948966,
  "propertiesByScale": {
    "x": [
      "x"
    ],
```
```
    "y": [
      "y"
    ]
  },
  "bb0": [
    -18.6,
    0.2240753173828125,
    12,
    37.77592468261719
  ]
},
"tweens": {
  "x": [
    -9,
    -38
  ],
  "y": [
    38,
    -9
  ],
  "rotation": [
    -1.5707963267948966,
    0
  ]
},
```

A second animation example—this time bar ordering from highest total sales to lowest total sales, by country—is shown in FIG. 9A, FIG. 9B, FIG. 9C, FIG. 9D, FIG. 9E and FIG. 9F. Tweening animation for the change in ordering is shown in FIGS. 9A through 9F. The script to invoke the animation includes the data set listed below.

```
var rows = [
{Region: "United States of America" , numOpps: 84000 , sumAmount: 89593967},
{Region: "China" , numOpps: 73273 , sumAmount: 56593967},
{Region: "Korea" , numOpps: 59373 , sumAmount: 44829767},
{Region: "Japan" , numOpps: 33243 , sumAmount: 39829767},
{Region: "Europe" , numOpps: 72781 , sumAmount: 35033967},
{Region: "Asia Pacific" , numOpps: 14402 , sumAmount: 33593967},
{Region: "India" , numOpps: 42933 , sumAmount: 30829222},
{Region: "Russia" , numOpps: 13273 , sumAmount: 24829767},
{Region: "Italy" , numOpps: 19402 , sumAmount: 16033967},
{Region: "Australia" , numOpps: 10000 , sumAmount: 14829767},
{Region: "France" , numOpps: 13781 , sumAmount: 12033967},
{Region: "South Africa" , numOpps: 6273 , sumAmount: 9033967},
{Region: "Africa" , numOpps: 7422 , sumAmount: 8033967}
]
chart.render('sfdc/charts/bar.js', config, rows);
```

The renderer uses the initial chart state and tweening instructions to generate order.animation.model.json, which includes 2516 lines, with non-procedural data structures for implementing the ordered bar chart animations that result in the bar chart shown in FIG. 9F.

Rendering Sequence

The rendering sequence includes the following actions: drawing a scene by setting the chart container document object model (DOM) size (scene.size); setting chart content DOM size (scene.fullSize) to mockup a scroll bar; and drawing cells. The sequence also includes clipping for viewport if the Boolean scrollX or scrollY for the cell is set to true, to enable scrolling in the horizontal or vertical directions inside the cell; and translating the origin to (cell.tx, cell.ty). The sequence continues by drawing the layers: and translating the origin to (layer.tx, layer.ty). The rendering sequence concludes by drawing the shapes: if a shape is rotated, translate the origin to (shape.x, shape.y); rotate the content; and draw the shape.

Scene graph cell labeling exemplifies the clipping viewport concept of selectively enabling or disabling rendering operations within a defined region of interest. FIG. 10B shows the viewport results for drawing cell (1,1) when both cell.scrollX and cell.scrollY are false: the framework will not clip the viewport when drawing cell(1,1). FIG. 10C shows the viewport 1048 for the case when cell.scrollX is true and cell.scrollY is false: the framework will clip the viewport when drawing cell(1,1). FIG. 10D shows the viewport 1078 for the case when cell.scrollX is false and cell.scrollY are true: the framework will clip the viewport when drawing cell(1,1).

The rendering primitive engine for secure isolation of scripting from graphics can be implemented as a native desktop application or as a native mobile device application. A desktop native application 282 or a native mobile device application 286 can integrate applications provided by one customer, partner or systems integrator, with cloud-based applications in use by large numbers of customers across multiple platforms. Alternatively, large organizations can integrate many existing apps that their users access in addition to those provided by the organization, so that users can accomplish all of their tasks in one place.

In one implementation, Canvas is a set of Salesforce™ tools and JavaScript APIs that customers can use to expose a desktop application as a Canvas app. That is, users can take new or existing applications and make them available to their customers as part of the customers' cloud-based experience. Instead of redesigning and reintegrating external applications, users can use canvas tools to integrate technology within Salesforce's Force.com canvas. The API enables users to retrieve context information about the environment in which the canvas app is running; and provides JavaScript support for cross-domain XML HTTP requests back to the Salesforce domain. Events provide a JavaScript-based way to send and receive events between canvas apps; and customers can use events to enable communication between multiple canvas apps on a single page. Users can add a canvas app as a custom action. A third-party app that a customer wants to expose as a canvas app can be written in any language, with the requirement that the app has a secure URL (HTTPS).

A script writer selects and configures a chart type from the primitive shape representations available in the disclosed unified charting framework, and can customize representations—working with scenes, cells, layers and shapes. Serialized scene data 252 that includes first data visualization, second data visualization and tweening parameters is sent by the native rendering tool to the desktop or mobile device application as serialized model data—in non-procedural data structures. For mobile device applications 286, the serialized model data can be rendered to provide the vector graphics that interact with a mobile device's graphics processing unit (GPU), to achieve hardware-accelerated rendering. IN one example the hardware-accelerated rendering can use OpenGL (Open Graphics Library), a cross-language, multi-platform API. These hardware-accelerated graphics are at a different level of abstraction than the disclosed unified charting framework, which provides serialized model data—in non-procedural data structures.

Layout templates in the disclosed unified charting framework define ways for users to develop a chart once, and then be able to customize the script for the chart: flipping across the vertical axis, rotating from horizontal to vertical alignment, etc. Users can compose a chart using shapes, apply the layout to shared patterns, and can duplicate layouts in a matrix. The unified framework can seamlessly provide behind-the-scene handling of clipping, scrolling, and tweening—the process of generating intermediate frames between two images to give the appearance that the first image evolves smoothly into the second image. Additionally the framework handles scaling, layout, and morphing—a special effect in animations that changes (or morphs) one image or shape into another through a seamless transition.

The disclosed technology for a unified charting framework includes a renderer which uses a list of primitive shape property representations as a specification for interpreting and generating visualizations. The renderer can iterate recursively through a data structure—digesting strings, and rendering visualizations. Conceptually, the rendering primitive engine 118 implements a mirror image of the primitive shape property representations used by the scene graph API 242. Data regions of charts include primitive shapes with defined property representations—with scenes, cells, layers and shapes. Supported shapes include lines, points, text, arcs, rectangles, polygons, bar charts, pie charts, scatter plots, pyramids, maps, gauges, line charts and sparklines.

Layout Templates and Axis Components

The disclosed unified charting framework includes pre-configured layout templates for common charts. The templates include a tabular layout with a number of rows and columns. Sizing for each row and column, visual order of each cell, and the scrolling property of each cell are also included in the layout templates. A z index property specifies the visual order of each cell to specify which of the layers the cell represents. Using the template, a script writer can fill the cells with different parts of their charts, with no need to pay attention to positioning details. For example, the legend position can be customized using 24 different options.

```
AxisLabels:{
    cells: [
        [ "header", "padding", "axis" ],
        [ "labels" , "padding", "plot" ]
    ],
    rows: [axisHeight, "100%"],
    columns: ["40%", constants.PADDING, "60%"],
    scrollY: ["labels", "plot"],
    zIndex: {
        1: ["plot"],
        2: ["axis"]
    }
}
```

The example visualization layout shown in FIG. 10A includes a chart with two rows and two columns which define four cells: axis cell 1022, plot cell 1026, header cell 1062 and labels cell 1066. By using the pre-configured layout templates, script writers can focus on filling in the cells with the parts of their charts, without paying attention to positioning. An example of use of a layout template is listed below.

```
var scene = imports.layoutBuilder.build({
    layout: "AxisLabels",
    size: config.size,
    transforms: transforms
});
var plotCell = scene.cellByKey("plot");
// create shapes to plot data points in plotCell
var layer = new Layer({cell: plotCell});
dataPoints.forEach(function(data){
    new Rect({layer: layer, x: 0, y: 0, w: data.value, h: 20, fill: 'red'});
});
```

The disclosed unified charting framework includes property representations for axis components for charts: a number axis, a labels axis, and a time axis. Axis.js includes 330 lines of code that handles axis labels and rotations; and includes the function xNumbers listed below, as well as parameter settings for various axis representations. A horizontal number axis component builds and returns a layer containing a horizontal number axis.

```
xNumbers = function(params) {
    var CONSTANTS = constants.AXIS.NUM;
    var defaultParams = {
        key: "axis",
        gridLineLength: 0,
        drawAxisLine: true,
        drawGridLines: true,
        title: ""
    };
    _.defaults(params, defaultParams);
    var cell = params.cell, scale = params.scale, format = params.format,
        gridLineLength = params.gridLineLength, drawAxisLine =
        params.drawAxisLine, drawGridLines = params.drawGridLines,
        refLines = params.refLines;
    var layer = new Layer({ cell: cell, key: params.key, staggerAnim:
        false });
    var formatter = utils.formatNumber(format, true);
    var domain = scale.domain( );
    var range = scale.range( );
    var rotated = cell.getScene( ).transforms.rotate;
...
* cell - [REQUIRED] cell to render into.
* scale - [REQUIRED] numerical Scale instance to visualize.
* key - axis key
* gridLineLength - length of gridline.
* format - format for numbers
* title - axis title.
...
```

A vertical number axis component builds and returns a layer containing a vertical number axis; parameters are listed below. A function is applied to transform the xNumbers function to be a function which can plot a vertical number axis. Utils.rotateBuilderFct is a function that takes a function as input, and returns another function. In the example shown below, the input is an xNumbers function, and the output is yNumbers; that is, the function returns a vertical number axis.

* cell—[REQUIRED] cell to render into.
* scale—[REQUIRED] numerical Scale instance to visualize.
* key—axis key
* gridLineLength—length of gridline.
* format—format for numbers
* title—axis title.

yNumbers: utils.rotateBuilderFct(xNumbers),

A horizontal labels axis component builds and returns a layer containing a horizontal labels axis; parameters are listed below.

* cell—[REQUIRED] cell to render into.
* headerCell—[OPTIONAL] cell to render header into.
* rows—[REQUIRED] data rows (each data row maps to one label row)
* fields—[REQUIRED] fields of each data row map to labels on a label row
* scale—[REQUIRED] an ordinal scale, domain includes values of data row fields, range indicates position
* key—axis key
* halign—label text halign.
*/
xLabels: utils.rotateBuilderFct(yLabels), A vertical labels axis component builds and returns a layer containing a vertical labels axis; parameters are listed below.
* Params:
* cell—[REQUIRED] cell to render into.
* headerCell—[OPTIONAL] cell to render header into.
* rows—[REQUIRED] data rows (each data row maps to one label row)
* fields—[REQUIRED] fields of each data row map to labels on a label row
* scale—[REQUIRED] an ordinal scale, domain includes values of data row fields, range indicates position
* key—axis key
* halign—label text halign.
yLabels: yLabels, A vertical time axis component of the unified charting framework can be used to build and return a layer containing a vertical time axis; parameters are listed below.
* Params:
* cell—[REQUIRED] cell to render into.
* plotCell—[REQUIRED] cell of plot content.
* scale—[REQUIRED] Scale instance for.
* key—axis key
* gridLineLength—length of gridline.
* granularity—level of time granularity on axis
* formats—a set of formats for each time granularity for tick labels
* title—axis title.
yTime: yTime, A horizontal time axis component of the unified charting framework can be used to build and return a layer containing a horizontal time axis; parameters are listed below.
* cell—[REQUIRED] cell to render into.
* plotCell—[REQUIRED] cell of plot content.
* scale—[REQUIRED] Scale instance for.
* key—axis key
* gridLineLength—length of gridline.
* granularity—level of time granularity on axis
* formats—a set of formats for each time granularity for tick labels
* title—axis title.
xTime: utils.rotateBuilderFct(yTime)

An example of the use of an axis component in bar.js is listed below.

```
imports.axis
    .xNumbers({
        cell: axisCell,
        scale: plotLayer.scales.x,
        gridLineLength: plotCell.h,
        format: measure.format,
        refLines: measure.referenceLines,
        title: utils.defaultText(measure.label, measure.column)
    });
```

A map chart is also included in the disclosed unified charting framework. FIG. 11 shows an example Mercator projection map, a cylindrical map projection often used for nautical purposes because of its ability to represent lines of constant course as straight segments that conserve the angles with the meridians. While the linear scale is equal in all directions around any point, thus preserving the angles and the shapes of small objects (which makes the projection conformal), the Mercator projection distorts the size of objects as the latitude increases from the Equator to the poles, where the scale becomes infinite. So, for example, Greenland and Antarctica appear much larger relative to land masses near the equator than they actually are. FIG. 11 includes dropdown options 1128 for transforming the map by flipping across the x axis, across the y axis, centering or rotating the map; and offers the option of choosing an equirectangular projection. The equirectangular projection is a simple map projection, shown in FIG. 12, which shows meridians mapped to vertical straight lines of constant spacing and circles of latitude to horizontal straight lines of constant spacing. The projection is neither equal area nor conformal; because of the distortions introduced by this projection, it finds its main use in thematic mapping. Shading in the maps in FIG. 11 and FIG. 12 denote population-related data. Note that maps are constructed from lines, points and arc, which are shapes available in the unified charting framework.

The unified charting framework includes mathematical grid functionality for creating interesting geometrical designs and pictures. A map scene uses a flat data structure for the layout, as shown in Map.js code listed below. The measure and dimension and color scale parameters get passed in: dimension specifies the name of the country code. A lookup table stores data for the US map; the system has coordinates for drawing Texas—using approximately 50 lines of code.

```
return function(config, rows) {
    var defaultConfig = {
        projection: "equirectangular"
    };
    _.defaults(config, defaultConfig);
    return imports.sceneBuilder.draw({
        config: config,
        rows: rows,
        layout: "Flat",
        plot: function(config, rows, scene) {
            var cell = scene.cellByKey("plot");
            var w = scene.size[0];
            var h = scene.size[1];
            var layer = new Layer({ cell: cell, x: w/2, y: h/2, key: "map", canSelect: true, highlightOnHover: true });
            var fields = {
                measure: config.measure.fields[0],
                dimension: config.dimension.fields[0]
            };
            // color scale
            var colorDomain = utils.getMinMax(_.pluck(rows, fields.measure.column));
            var colorScale =
scales.gradient( ).domain(fields.measure.domain ||
colorDomain).range(fields.measure.range || ["#f00", "#ff0"]);
            var format = function(nb) { return
utils.formatNumber(fields.measure.format, nb, false); };
            geo.draw({
                layer: layer,
                size: scene.size,
                projection: config.projection,
                colorScale: colorScale,
                format: format,
                rows: rows,
                fields: fields
            });
        }
    });
};
```

A powerful feature of the unified charting framework is the ability to customize visualizations, by extending existing data. An example political map shown in FIG. 13 includes scenes of the most recent three of a series of maps of presidential election results by red (Republican) and blue (Democrat) states, over time, with a chart for each election cycle. The visualization is enriched by the inclusion of headers in the top cells of the chart, showing the blue and red header boxes with the center top cell displaying the name of the presidents, from the available data. A script writer can add script lines to customize the headers, or the representations displayed as visualizations.

Continuing with the example political map, a viewer of the map can use their mouse or other pointing device to hover over a state, to view additional information. Colorado has a difference of 1 (a blue state) as shown in the popup shown in FIG. 14A; and Kansas has a difference of −1 (a red state) in the map popup shown in FIG. 14B. Part of the configuration includes comparing data available publicly for Democrats and Republicans, and generating a difference. An example CSV data snippet is listed for 2012. Each scene visualization shown in FIG. 13 uses a similar data set which describes the election year being displayed.

| year | state | dem | rep |
|---|---|---|---|
| 2012 | Alabama | 38.8 | 61.2 |
| 2012 | Alaska | 42.7 | 57.3 |
| 2012 | Arizona | 45.4 | 54.6 |
| 2012 | Arkansas | 37.8 | 62.2 |
| 2012 | California | 61.9 | 38.1 |
| 2012 | Colorado | 52.7 | 47.3 |
| 2012 | Connecticut | 58.8 | 41.2 |
| 2012 | Delaware | 59.4 | 40.6 |
| 2012 | Florida | 50.4 | 49.6 |
| 2012 | Georgia | 46 | 54 |
| 2012 | Hawaii | 71.7 | 28.3 |
| 2012 | Idaho | 33.6 | 66.4 |
| 2012 | Illinois | 58.6 | 41.4 |
| 2012 | Indiana | 44.8 | 55.2 |
| 2012 | Iowa | 53 | 47 |
| 2012 | Kansas | 38.9 | 61.1 |
| 2012 | Kentucky | 38.5 | 61.5 |
| 2012 | Louisiana | 41.3 | 58.7 |
| ... | ... | | |
| 2012 | Tennessee | 39.6 | 60.4 |
| 2012 | Texas | 42 | 58 |
| 2012 | Utah | 25.4 | 74.6 |
| 2012 | Vermont | 68.2 | 31.8 |
| 2012 | Virginia | 52 | 48 |
| 2012 | Washington | 57.6 | 42.4 |
| 2012 | West Virginia | 36.3 | 63.7 |
| 2012 | Wisconsin | 53.5 | 46.5 |

The political map's popup functionality shown in FIG. 14A and FIG. 14B is driven by a simple script which compares two data results, and uses the difference to decide whether a state is to be displayed red or blue for the given election year; US-elections.js is listed below.

```
return function(config, rows) {
    rows.forEach(function(row) {
        row.type = "Dem – Rep";
        row.result = (row.dem > row.rep ? 1 : −1);
        row.diff *= (row.dem > row.rep ? 1 : −1);
    });
    var scene = imports.Map(config, rows);
    var candidates = {
        "2012": "Obama, Barack - Romney, Mitt",
        "2008": "Obama, Barack - McCain, John",
        "2004": "Kerry, John - Bush, George W.",
        "2000": "Gore, Al - Bush, George W.",
        "1996": "Clinton, Bill - Dole, Bob",
        "1992": "Clinton, Bill - Bush, George H.W.",
        "1988": "Dukakis, Michael - Bush, George H.W.",
        "1984": "Mondale, Walter - Reagan, Ronald",
        "1980": "Carter, Jimmy - Reagan, Ronald",
        "1976": "Carter, Jimmy - Ford, Gerald",
```

-continued

```
        "1972": "McGovern, George - Nixon, Richard",
        "1964": "Johnson, Lyndon (LBJ) - Goldwater, Barry",
        "1960": "Kennedy, Jack (JFK) - Nixon, Richard",
        ...
    };
    var cell = scene.cellByKey("content");
    for (var year in candidates) {
        var layer = cell.layerByKey("Dem - Rep/" + year + "/map");
        if (layer) {
            var bb = layer.boundingBox( );
            new Rect({layer: layer, key: "rect", x: -bb.w/2, w: bb.w, y:
-bb.h/2 - 16, h: 14, fill: "#ff8", stroke: "#444", opacity: 0.5});
            new Text({layer: layer, key: "name", x: 0, y: -bb.h/2 - 8,
halign: "center", valign: "middle", text: candidates[year]});
            new Rect({layer: layer, key: "rect-dem", x: -bb.w/2, w: 40,
y: -bb.h/2 - 16, h: 14, fill: "#00d", stroke: "#444"});
            new Rect({layer: layer, key: "rect-rep", x: bb.w/2, w: -40,
y: -bb.h/2 - 16, h: 14, fill: "#d00", stroke: "#444"});
        }
    }
};
```

As shown in the political map example, the disclosed unified charting framework enables customizations of scene visualizations, while animating and scaling resulting scenes seamlessly.

The hierarchy of nodes includes scenes, cells, layers and shapes, as described above. In addition to the bar chart described extensively herein, the disclosed unified charting framework includes pie, pyramid, scatter, sparkline, timeline, and gauge chart types, with JavaScript similar in structure of bar.js, included for rendering each chart type in the framework. Native device applications can also include node types of text, line, point, arc, rectangle and polygon. FIG. 15 shows various gauge chart examples. The gauge.json script, listed below shows the configuration for delivering gauge charts. Scene builder and range helper functions are used for building the gauge visualizations.

```
{
    "name": "Gauge",
    "shortname": "Gauge",
    "config": [
        {"type": "MEASURE", "label": "Measure", "min": 1, "max": 1,
"property": "measure", "colorable": false},
        {"type": "RANGE", "label": "Segment Ranges",
"colorable": true, "labelable": true, "extremas": true, "min": 3,
"max": 3, "property": "ranges"}
    ],
    "requires": {
        "sceneBuilder": "sfdc/utils/sceneBuilder.js",
        "rangeHelpers": "sfdc/utils/rangeHelpers.js"
    }
}
```

Gauge.js includes 290 lines of code, which implement the process of determining the position along an arc and defining constants. Additional features for gauge scenes include building the colored segments, building the needle cap styling, building the shaded tick container, building the tick labels, building segment labels, building the needle and the value label, and returning the scene.

FIG. 16 shows four line chart examples, which can be generated using the disclosed unified charting framework. Line.js includes 142 lines of code that uses sceneBuilder function to draw lines in cells in layers, with labels on axes, with scaling and plot placement handled by the framework.

Line_metrics.json is listed below, and shows the configuration parameters for generating line charts, such as vertical or horizontal, line thickness, fill area, and whether to show points on the line chart. Scene builder functionality and axis.js are used for building the line chart visualizations.

```
{
    "name": "Line Chart",
    "shortname": "Line",
    "config": [
        {"type": "DIMENSION", "label": "Dimension", "min": 1,
"max": 3, "property": "dimension"},
        {"type": "MEASURE", "label": "Measure", "min": 1, "max": 2,
"property": "measure", "colorable": true, "supportsReferenceLines":true},
        {"type": "INTEGER", "label": "Category Height", "min": 1,
"max": 1, "defaults": [26], "property": "labelSize"},
        {"type": "BOOLEAN", "label": "Vertical", "min": 1, "max": 1,
"defaults": [false], "property": "vertical"},
        {"type": "INTEGER", "label": "Thickness", "min": 1, "max": 1,
"defaults": [2], "property": "thickness"},
        {"type": "BOOLEAN", "label": "Fill Area", "min": 1, "max": 1,
"defaults": [true], "property": "fillArea"},
        {"type": "BOOLEAN", "label": "Show Points", "min": 1,
"max": 1, "defaults": [false], "property": "showPoints"}
    ],
    "requires": {
        "sceneBuilder": "sfdc/utils/sceneBuilder.js",
        "axis": "sfdc/utils/axis.js"
    }
}
```

In addition to the bar chart described extensively herein, and the gauge and line chart examples discussed above, the disclosed unified charting framework includes pie, pyramid, scatter, sparkline, and timeline chart types, with JavaScript similar in structure to bar.js, included for rendering each chart type in the framework. Pie.js includes 97 lines of code that plots a scene with arc shapes, based on the configuration passed to the sceneBuilder function. Scaling and colors and layers are handled by the unified charting framework. Similarly, pyramid.js is 94 lines of code that uses sceneBuilder function to draw bars in layers, with labels on axes. Scaling and plot placement are taken care of by the framework. Listed below is an example horizontal pyramid chart represented in JSON.

```
{
    "name": "Horizontal Pyramid Chart",
    "shortname": "Pyramid",
    "config": [
        {"type": "MEASURE", "label": "First Measure", "min": 1,
"max": 1, "property": "firstMeasure", "colorable": true},
        {"type": "MEASURE", "label": "Second Measure", "min": 1,
"max": 1, "property": "secondMeasure", "colorable": true},
        {"type": "INTEGER", "label": "Mark Size", "min": 1, "max": 1,
"defaults": [25], "property": "markSize"},
        {"type": "INTEGER", "label": "Mark Spacer", "min": 1,
"max": 1, "defaults": [1], "property": "markSpacer"},
        {"type": "DIMENSION", "label": "Dimension", "min": 1,
"max": 1, "property": "dimension"},
        {"type": "BOOLEAN", "label": "Vertical", "min": 1, "max": 1,
"defaults": [false], "property": "vertical"}
    ],
    "requires": {
        "sceneBuilder": "sfdc/utils/sceneBuilder.js",
        "axis": "sfdc/utils/axis.js"
    }
}
```

Scatter.js is 108 lines of code that uses sceneBuilder and generates a scatter plot chart with axes and scaling, based on the configuration parameters. A layer with the points is described by a snippet of scatter.js is listed below.

```
// Layer: points
        var plotLayer = new Layer({key: "points", cell: plotCell,
canSelect: true, highlightOnHover: true });
        var keyFct = utils.getValueFct(keys);
        var xFct = utils.getValueFct(x);
        var yFct = utils.getValueFct(y);
        var rFct = utils.getValueFct(r);
        var colorFct = utils.getValueFct(color);
        var relevantColumns =
_.pluck(utils.uniqueFields(config.x.fields, config.y.fields, (config.r &&
config.r.fields ? config.r.fields : null), (config.color &&
config.color.fields ? config.color.fields : null)), "column");
        rows.forEach(function(row){
            var color = colorScale.scale(colorFct(row));
            var value = rFct(row);
            var isPositive = value >= 0;
            new Point({
                layer: plotLayer,
                key: keyFct(row),
                x: xFct(row),
                y: yFct(row),
                r: rScale.scale(Math.abs(value)),
                fill: color,
                stroke: color,
                lineWidth: 1,
                fillOpacity: (isPositive ? 0.7 : 0.1),
                data: _.pick(row, relevantColumns)
            });
        });
```

Sparkline includes 74 lines of code that uses configuration values to create a scene with a sparkline. A snippet of sparkline.js is listed below, showing code that handles the sparkline layer, after the colors, axes, headers, etc. have been set up.

```
// Layer: sparkline
var sparkLayer = new Layer({cell: sparkCell, key: "spark" });
var minVal = _.min(values);
var i;
for (i = 0; i < values.length - 1; i++) {
    new Line({
        layer: sparkLayer,
        key: "val_" + i,
        x0: i,
        y0: values[i],
        x1: i + 1,
        y1: values[i+1],
        stroke: color,
        fill: color,
        baseYValue: minVal,
        vertical: true,
        fillOpacity: 0.1
    });
}
...
```

Timeline.js uses configuration values to create a scene with a timeline, and includes 137 lines of code. A snippet of timeline.js is listed below, showing code that handles the plot layer, after the key fields for the colors, axes, headers, etc. have been set up. Time axis cell, plot cell and axis cell each refer to a key string identifier.

```
...
    plotLayer
        .groupBy(color)
        .forEach(function(group){
            group.connectBy(function(p0, p1){
                var connect = true;
                if (missing Value ===
constants.MISSING_VALUE.DISCONNECT) {
                    connect =
                        moment(p1.y).startOf(time.dataGranularity).isSame(mo-
ment(p0.y).startOf(time.dataGranularity).add(1, time.dataGranularity));
                }
                if (connect) {
                    if (!showPoints) {
                        p0.set({r: 0});
                        p1.set({r: 0});
                    }
                    new Line({
                        x0: p0.x,
                        y0: p0.y,
                        x1: p1.x,
                        y1: p1.y,
                        fill: fillArea ? p0.fill : null,
                        stroke: p0.stroke,
                        fillOpacity: 0.1,
                        baseXValue: p0.x,
                        lineWidth: thickness,
                        key: p0.key + '/' + p1.key,
                        nonSelectable: true
                    }).prependTo(group);
                }
            });
        });
...
```

The unified charting framework empowers script writers to customize animated visualizations using the property representations in the hierarchy of scenes, cells, layers and shapes described. Workflow for secure isolation of scripting from native graphic rendering of animated data visualizations is described below.

Workflow

FIG. 17 shows the flow 1700 of one implementation of a recursive cell-based hierarchy for data visualizations, with secure isolation of scripting from native graphic rendering of animated data visualizations, in a unified charting framework. The framework can be accessed by customer support admins to customize visualizations, and that provides a secure interface to low-level graphic APIs. Other implementations may perform the steps in different orders and/or with different, fewer or additional steps than the ones illustrated in FIG. 17. Multiple steps can be combined in some implementations.

At action 1702, a run time script processing tool receives a first chart to be visualized in a first chart visualization, and a second chart to be visualized in a second chart visualization.

At action 1703, the run time script processing tool runs the first visualization script against the first data and first chart parameters to generate a serialized first data set that describes the first data visualization.

At action 1704, the run time script processing tool runs the second visualization script against the second data and second chart parameters to generate a serialized second data set that describes the second data visualization.

At action 1705, the run time script processing tool automatically calculates tweening parameters to animate the transition between the first data visualization and the second data visualization.

At action 1706, a run time native rendering tool receives the serialized first data set and the serialized second data set together with the tweening parameters, or a path to the serialized first data set and the serialized second data set together with the tweening parameters, and displays the first data visualization and an animated transition to the second data visualization.

Computer System

FIG. 18 is a block diagram of an example computer system 1800 for implementing a recursive cell-based hierarchy for data visualizations, with secure isolation of scripting from native graphic rendering of animated data visualizations, in a unified charting framework. The processor can be an ASIC or RISC processor. It can be an FPGA or other logic or gate array. It can include graphic processing unit (GPU) resources. Computer system 1810 typically includes at least one processor 1872 that communicates with a number of peripheral devices via bus subsystem 1850. These peripheral devices may include a storage subsystem 1824 including, for example, memory devices and a file storage subsystem, user interface input devices 1838, user interface output devices 1876, and a network interface subsystem 1874. The input and output devices allow user interaction with computer system 1810. Network interface subsystem 1874 provides an interface to outside networks, including an interface to corresponding interface devices in other computer systems.

User interface input devices 1838 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1810.

User interface output devices 1876 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1810 to the user or to another machine or computer system.

Storage subsystem 1824 stores programming and data constructs that provide the functionality of some or all of the methods described herein. This software is generally executed by processor 1872 alone or in combination with other processors.

Memory 1822 used in the storage subsystem can include a number of memories including a main random access memory (RAM) 1834 for storage of instructions and data during program execution and a read only memory (ROM) 1832 in which fixed instructions are stored. A file storage subsystem 1836 can provide persistent storage for program and data files, and may include a hard disk drive, a floppy disk drive along with associated removable media, a CD-ROM drive, an optical drive, or removable media cartridges. The software used to implement the functionality of certain systems may be stored by file storage subsystem 1836 in the storage subsystem 1824, or in other machines accessible by the processor.

Bus subsystem 1850 provides a mechanism for letting the various components and subsystems of computer system 1810 communicate with each other as intended. Although bus subsystem 1850 is shown schematically as a single bus, alternative implementations of the bus subsystem may use multiple busses.

Computer system 1810 can be of varying types including a workstation, server, computing cluster, blade server, server farm, or any other data processing system or computing device. Due to the ever-changing nature of computers and networks, the description of computer system 1810 depicted in FIG. 18 is intended only as one example. Many other configurations of computer system 1810 are possible having more or fewer components than the computer system depicted in FIG. 18.

Particular Implementations

In some implementations, a method of isolating scripting from native graphic engine rendering of animated data visualizations includes receiving messages at a run time script processing tool from another program or interface. The messages include a first output comprising first selected data to be visualized in a body of a first scene, first chart parameters defining visualization chart elements in the first scene, and a first static visualization script that produces a first data visualization of the first selected data; and a second output comprising second selected data to be visualized in a body of a second scene, second chart parameters defining visualization chart elements in the second scene, and a second static visualization script that produces a second data visualization of the second selected data. The disclosed method also includes operating the run time script processing tool, comprising running the first static visualization script against the first data and first chart parameters in the first output to generate a serialized first data set that describes the first data visualization as shapes that represent data regions of the chart and other chart components; running the second static visualization script against the second data and second chart parameters in the second output to generate a serialized second data set that describes the second data visualization as shapes that represent data regions of the chart and other chart components; and automatically calculating tweening parameters to animate transition between the first data visualization and the second data visualization. The method further includes causing display of the first data visualization and then of an animated transition from the first data visualization to the second data visualization by successively passing to a run time native rendering tool the serialized first data set and the serialized second data set together with the tweening parameters.

In some implementations, the disclosed method can further include in the run time native rendering tool, receiving a data set or reference to the data set, marshalling the data set into the first data visualization and the second data visualization, and executing the tweening between the first data visualization and the second data visualization.

In some implementations, the method is enhanced by further including multiple charts, wherein a visualization of the data set includes multiple charts concurrently visible. The disclosed method includes each chart, into which an associated data set returned by an associated query, is translated by an associated visualization widget into a scene; and a plurality of the charts set a facet property, wherein the facet property links operation of data filtering controls among the charts, wherein selection of a data filter control in one chart causes the selected data filter control to be applied to additional charts that have the facet property set.

In some implementations, the method is enhanced, wherein a script to generate the scene graph of the first data visualization executes in an iFrame secure environment. In other implementations, the method is enhanced wherein the run time native rendering tool is implemented, across multiple platforms that have different operating systems, as a native desktop application. In yet other implementations, the method is enhanced wherein the run time native rendering tool is implemented, across multiple platforms that have different operating systems, as a native mobile device application.

In some implementations, a disclosed system and method of developing computer-displayed animated data visualizations with isolation of scripting from native graphic engine rendering of animated data visualizations includes operating a development tool that includes representation of animated data visualizations in an object hierarchy that includes at least one scene, multiple cells per scene, one or more layers per cell and shapes on the layers, wherein the cells subdivide the scene into areas holding different components of a data visualization to be animated cell-wise. The system and method further include script editing to implement edits to static visualization scripts that compose scenes of animated data visualizations from data selected from a dataset. For a first scene, the method includes generating a first output comprising first selected data to be visualized in a body cell, first chart parameters defining visualization frame elements in frame cells, and a first static visualization script identifier that invokes a first static visualization script to produce a first data visualization of the first selected data. A second scene includes generating second output comprising second selected data to be visualized in a body cell, second frame parameters defining visualization frame elements in frame cells, and a second static visualization script identifier that invokes the static visualization to produce a second data visualization of second selected data; and storing the first output and the second output. The disclosed method further includes operating a script processing tool in a browser, a web app or in a native desktop or mobile application, coupled in communication with the development tool, comprising running the first static visualization script against the first data and first parameters in the first output; and generating a serialized first data set that describes the first data visualization. Additionally the script processing tool also runs the second static visualization script against the second data and second parameters in the second output; and generates a serialized second data set that describes the shapes that represent data regions of the chart and other chart components in second data visualization. Further, script processing tool automatically calculates tweening parameters to animate cell-wise transition from the body and frame cells in the first data visualization to the body and frame cells in the second data visualization. The disclosed method also includes successively passing, to a run time native rendering tool, the serialized first data set and the serialized second data set together with the tweening parameters; and causing display of the first data visualization and an animated transition from the first data visualization to the second data visualization.

In one implementation the disclosed method, includes a scene that includes a key string identifier, two numbers that represent a size of a rectangle for the scene, two numbers that represent a position of the rectangle for the scene, and a number that represents a size for scene content. The method also includes a cell that includes a key string identifier, two numbers that represent a relative position of the cell, an index count of a cell that sets a layer order, a set of four numbers that represent coordinates for a rectangle for the cell, a settable Boolean flag for enabling scrolling in an x direction, and a settable Boolean flag for enabling scrolling in a Y direction. Additionally, the method can include one or more layers, that each include a key string identifier, two numbers that represent a width and height of the cell, two numbers that represent a translation of a location of a cell origin, a settable Boolean flag for enabling staggering of the animation between the shapes in the layer, and a set of three numbers that represent coordinates for scaling applied to the shapes in the layer.

In one implementation, the disclosed method includes representing a chart in a scene data object that divides a scene into cell quadrants, the scene data object including at least four cells: a plot cell, a pair of axis cells adjoining the plot cell and a fourth cell adjoining the axis cells and diagonally opposed from the plot cell wherein the scene data object represents the chart by an object hierarchy that includes at least one scene, multiple cells per scene, one or more layers per cell and shapes in the cells, wherein the cells subdivide the scene into areas holding different components of a data visualization to be animated cell-wise and the shapes that represent data regions in the plot cell and other chart components. The method also includes transforming selected data into a data visualization by running a script against the selected data, wherein the script implements a chart type, identifies the chart type for animation purposes, and translates the selected data into shapes in the plot cell and lines, text and other annotations in one or more of the four cells of the scene data object. The method further includes processing data in first and second scene data objects and automatically selecting a transition path and tweening parameters based on the first and second chart types of the first and second scene data objects; and further processing the first and second data scene objects and the tweening parameters to cause display of a first data visualization and an animated transition from the first data visualization to a second data visualization. The method can include a fourth cell that is a header cell that holds header data; and can include the header cell recursively holding cells within the header cell. The disclosed method further includes recursively representing in the scene data object cells within cells.

In some implementations, a disclosed method includes accepting user input that edits a standard script to produce a custom script and using the custom script against the selected data to produce the data visualization, wherein the custom script retains the chart type for animation purposes. The method can further include accepting user input that wraps a standard script in a data pre-processing script to produce a custom script and using the custom script against the selected data to produce the data visualization, wherein the custom script retains the chart type for animation purposes. The method can also include transforming the first and second data scene objects and tweening parameters into data representation that excludes script instructions and passing the data representations to a native rendering tool.

In one implementation, a disclosed device includes at least one processor and memory coupled to the processor, the memory holding program instructions that, when executed, carry out actions of representing a chart in a scene a data object that divides a scene into cell quadrants, the scene data object including at least four cells: a plot cell, a pair of axis cells adjoining the plot cell and a fourth cell adjoining the axis cells and diagonally opposed from the plot cell, wherein the scene data object represents the chart by an object hierarchy that includes at least one scene, multiple cells per scene, one or more layers per cell and shapes in the cells, and wherein the cells subdivide the scene into areas holding different components of a data visualization to be animated cell-wise and the shapes that represent data regions in the plot cell and other chart components. The actions of the device also include transforming selected data into a data visualization by running a script against the selected data, wherein the script implements a chart type, identifies the chart type for animation purposes, and translates the selected data into shapes in the plot cell and lines, text and other annotations in one or more of the four cells of the scene data object. Further actions of the device include processing data in first and second scene data objects and automatically selecting a transition path and tweening parameters based on the first and second chart types of the first and second scene data objects; and further processing the first and second data scene objects and the tweening parameters to cause display of a first data visualization and an animated transition from the first data visualization to a second data visualization.

Some implementations of the disclosed device further include recursively representing in the scene data object cells within cells; and can also include accepting user input that edits a standard script to produce a custom script and using the custom script against the selected data to produce the data visualization, wherein the custom script retains the chart type for animation purposes. In some implementations, the disclosed device further includes accepting user input that wraps a standard script in a data pre-processing script to produce a custom script and using the custom script against the selected data to produce the data visualization, wherein the custom script retains the chart type for animation purposes. Additionally, the disclosed device includes transforming the first and second data scene objects and tweening parameters into data representation that excludes script instructions and passing the data representations to a native rendering tool.

In another disclosed implementation, a method includes representing a trellis of charts in a trellis data object that includes multiple scene data object instances wherein scene data objects represent charts and are organized in the trellis data object to represent an arrangement of the charts in a trellis. The charts in the trellis are separated by perpendicular line segments, and each scene object divides a scene into cells separated by perpendicular line segments including at least one plot cell and at least one header cell. Also the scene data object in the disclosed method represents the chart by an object hierarchy that includes at least one scene, multiple cells per scene, one or more layers per cell and shapes in the cells, wherein the cells subdivide the scene into areas holding different components of a data visualization and the shapes represent data regions in the plot cell and other chart components. The method further includes transforming selected data into a data visualization by running a script against the selected data, wherein the script implements a chart type, identifies the chart type for animation purposes, and translates the selected data into shapes on layers in the plot cell and into lines and text on layers in one or more cells other than the plot cell; and further processing the trellis data object to cause display of a trellis of charts. The disclosed method can further include accepting user input that edits a standard script to produce a custom script and using the custom script against the selected data to produce the data visualization, wherein the custom script retains the chart type for animation purposes. Additionally the method can include accepting user input that wraps a standard script in a data pre-processing script to produce a custom script and using the custom script against the selected data to produce the data visualization, wherein the custom script retains the chart type for animation purposes; and can also include transforming the trellis data object into a data representation that excludes script instructions and passing the data representation to a native rendering tool. Some implementations of the method further include processing data in first and second scene data objects and automatically selecting a transition path and tweening parameters based on the first and second chart types of the first and second scene data objects. The method also includes transforming the first and second data scene objects and tweening parameters into data representations that exclude script instructions and passing the data representations to a native rendering tool.

Other implementations may include a computer implemented system to perform any of the methods described above, the system including a processor, memory coupled to the processor, and computer instructions loaded into the memory.

Yet another implementation may include a tangible computer readable storage medium including computer program instructions that cause a computer to implement any of the methods described above. The tangible computer readable storage medium does not include transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer implemented method of isolating scripting from native graphic engine rendering of animated data visualizations, including:
   receiving at a run time script processing tool, messages comprising:
      first output comprising first selected data to be visualized in a body of a first scene, first chart parameters defining visualization chart elements in the first scene, and a first static visualization script that produces a first data visualization of the first selected data; and
      second output comprising second selected data to be visualized in a body of a second scene, second chart parameters defining visualization chart elements in the second scene, and a second static visualization script that produces a second data visualization of the second selected data;
   operating the run time script processing tool, comprising:
      running the first static visualization script against the first data and first chart parameters in the first output to generate a serialized first data set that describes the first data visualization as shapes that represent data regions of the chart and other chart components;
      running the second static visualization script against the second data and second chart parameters in the second output to generate a serialized second data set that describes the second data visualization as shapes that represent data regions of the chart and other chart components;
      automatically calculating tweening parameters to animate transition between the first data visualization and the second data visualization; and
   causing display of the first data visualization and then of an animated transition from the first data visualization to the second data visualization by successively passing to a run time native rendering tool the serialized first data set and the serialized second data set together with the tweening parameters.

2. The method of claim 1, further including, in the run time native rendering tool, receiving a data set or reference to the data set, marshalling the data set into the first data visualization and the second data visualization, and executing the tweening between the first data visualization and the second data visualization.

3. The method of claim 1, wherein a visualization of the data set includes multiple charts concurrently visible, further including:
- each chart, into which an associated data set returned by an associated query, is translated by an associated visualization widget into a scene; and
- a plurality of the charts set a facet property, wherein the facet property links operation of data filtering controls among the charts, wherein selection of a data filter control in one chart causes the selected data filter control to be applied to additional charts that have the facet property set.

4. The method of claim 1, wherein the first data visualization script executes in an iFrame.

5. The method of claim 1, wherein the run time native rendering tool is implemented, across multiple platforms that have different operating systems, as a native desktop application.

6. The method of claim 1, wherein the run time native rendering tool is implemented, across multiple platforms that have different operating systems, as a native mobile device application.

7. A computer implemented method of isolating scripting from native graphic engine rendering of animated data visualizations, including:
- receiving at a run time script processing tool, messages comprising:
  - representation of animated data visualizations in an object hierarchy that includes at least one scene, multiple cells per scene, one or more layers per cell and shapes in the cells, wherein the cells subdivide the scene into areas holding different components of a data visualization to be animated cell-wise;
  - first output comprising first selected data to be visualized in a body cell, first chart parameters defining visualization chart elements in chart cells, and a first static visualization script identifier that invokes a first static visualization script to produce a first data visualization of the first selected data;
  - second output comprising second selected data to be visualized in a body cell, second chart parameters defining visualization chart elements in chart cells, and a second static visualization script identifier that invokes the static visualization to produce a second data visualization of the second selected data; and
  - the first and second static visualization scripts;
- operating the run time script processing tool, comprising:
  - running the first static visualization script against the first data and first parameters in the first output;
  - generating a serialized first data set that describes the first data visualization in a first data;
  - running the second static visualization script against the second data and second parameters in the second output;
  - generating a serialized second data set that describes the second data visualization in a second data;
  - automatically calculating tweening parameters to animate cell-wise transition from the body and visualization chart elements cells in the first data visualization to the body and visualization chart elements cells in the second data visualization; and
- causing display of the first data visualization and then of an animated transition from the first data visualization to the second data visualization by successively passing to a run time native rendering tool the serialized first data set and the serialized second data set together with the tweening parameters.

8. The method of claim 7, wherein a scene includes a key string identifier, two numbers that represent a size of a rectangle for the scene, two numbers that represent a position of the rectangle for the scene, and a number that represents a size for scene content.

9. The method of claim 7, wherein a cell includes a key string identifier, two numbers that represent a relative position of the cell, an index count of a cell that sets a layer order, a set of four numbers that represent coordinates for a rectangle for the cell, a settable Boolean flag for enabling scrolling in an x direction, and a settable Boolean flag for enabling scrolling in a Y direction.

10. The method of claim 7, wherein a layer include a key string identifier, two numbers that represent a width and height of the cell, two numbers that represent a translation of a location of a cell origin, a settable Boolean flag for enabling staggering of the animation between the shapes in the layer, and a set of three numbers that represent coordinates for scaling applied to the shapes in the layer.

11. The method of claim 7, wherein the first data visualization script executes in an iFrame.

12. The method of claim 7, wherein the run time native rendering tool is implemented, across multiple platforms that have different operating systems, as a native desktop application.

13. The method of claim 7, wherein the run time native rendering tool is implemented, across multiple platforms that have different operating systems, as a native mobile device application.

14. A system of routing of isolating scripting from native graphic engine rendering of animated data visualizations, the system including:
- a processor, memory coupled to the processor, and computer instructions loaded into the memory that, when executed, cause the processor to implement a process that includes:
- receiving at a run time script processing tool, messages comprising:
  - first output comprising first selected data to be visualized in a body of a first scene, first chart parameters defining visualization chart elements in the first scene, and a first static visualization script that produces a first data visualization of the first selected data; and
  - second output comprising second selected data to be visualized in a body of a second scene, second chart parameters defining visualization chart elements in the second scene, and a second static visualization script that produces a second data visualization of the second selected data;
- operating the run time script processing tool, comprising:
  - running the first static visualization script against the first data and first chart parameters in the first output to generate a serialized first data set that describes the first data visualization as shapes that represent data regions of the chart and other chart components;
  - running the second static visualization script against the second data and second chart parameters in the second output to generate a serialized second data set that describes the second data visualization as shapes that represent data regions of the chart and other chart components;
  - automatically calculating tweening parameters to animate transition between the first data visualization and the second data visualization; and
- causing display of the first data visualization and then of an animated transition from the first data visualization to the second data visualization by successively passing to a run time native rendering tool the serialized first data set and then the serialized second data set together with the tweening parameters.

15. The system of claim 14, further including, in the run time native rendering tool, receiving a data set or reference to the data set, marshalling the data set into the first data visualization and the second data visualization, and executing the tweening between the first data visualization and the second data visualization.

16. The system of claim 14, wherein a visualization of the data set includes multiple charts concurrently visible, further including:
 each chart, into which an associated data set returned by an associated query, is translated by an associated visualization widget into a scene; and
 a plurality of the charts set a facet property, wherein the facet property links operation of data filtering controls among the charts, wherein selection of a data filter control in one chart causes the selected data filter control to be applied to additional charts that have the facet property set.

17. The system of claim 14, wherein the first data visualization script executes in an iFrame.

18. The system of claim 14, wherein the run time native rendering tool is implemented, across multiple platforms that have different operating systems, as a native desktop application.

19. The system of claim 14, wherein the run time native rendering tool is implemented, across multiple platforms that have different operating systems, as a native mobile device application.

20. A tangible computer readable storage medium loaded with computer instructions that, when executed, cause a computer system to perform actions that isolate scripting from native graphic engine rendering of animated data visualizations, the actions including:
 receiving at a run time script processing tool, messages comprising:
  first output comprising first selected data to be visualized in a body of a first scene, first chart parameters defining visualization chart elements in the first scene, and a first static visualization script that produces a first data visualization of the first selected data; and
  second output comprising second selected data to be visualized in a body of a second scene, second chart parameters defining visualization chart elements in the second scene, and a second static visualization script that produces a second data visualization of the second selected data;
 operating the run time script processing tool, comprising:
  running the first static visualization script against the first data and first chart parameters in the first output to generate a serialized first data set that describes the first data visualization as shapes that represent data regions of the chart and other chart components;
  running the second static visualization script against the second data and second chart parameters in the second output to generate a serialized second data set that describes the second data visualization as shapes that represent data regions of the chart and other chart components;
  automatically calculating tweening parameters to animate transition between the first data visualization and the second data visualization; and
 causing display of the first data visualization and then of an animated transition from the first data visualization to the second data visualization by successively passing to a run time native rendering tool the serialized first data set and then the serialized second data set together with the tweening parameters.

21. The tangible computer readable storage medium of claim 20, further including, in the run time native rendering tool, receiving a data set or reference to the data set, marshalling the data set into the first data visualization and the second data visualization, and executing the tweening between the first data visualization and the second data visualization.

22. The tangible computer readable storage medium of claim 20, wherein a visualization of the data set includes multiple charts concurrently visible, further including:
 each chart, into which an associated data set returned by an associated query, is translated by an associated visualization widget into a scene; and
 a plurality of the charts set a facet property, wherein the facet property links operation of data filtering controls among the charts, wherein selection of a data filter control in one chart causes the selected data filter control to be applied to additional charts that have the facet property set.

23. The tangible computer readable storage medium of claim 20, wherein the first data visualization script executes in an iFrame.

24. The tangible computer readable storage medium of claim 20, wherein the run time native rendering tool is implemented, across multiple platforms that have different operating systems, as a native desktop application.

25. The tangible computer readable storage medium of claim 20, wherein the run time native rendering tool is implemented, across multiple platforms that have different operating systems, as a native mobile device application.

* * * * *